United States Patent
Huang et al.

(10) Patent No.: US 12,167,291 B2
(45) Date of Patent: Dec. 10, 2024

(54) METHOD FOR TRANSMITTING BEAM FAILURE RECOVERY REQUEST, METHOD FOR RECEIVING BEAM FAILURE RECOVERY REQUEST, TERMINAL AND BASE STATION

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN); Erlin Zeng, Beijing (CN); Pierre Bertrand, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 290 days.

(21) Appl. No.: 17/764,971

(22) PCT Filed: Sep. 11, 2020

(86) PCT No.: PCT/CN2020/114690
§ 371 (c)(1),
(2) Date: Mar. 29, 2022

(87) PCT Pub. No.: WO2021/063165
PCT Pub. Date: Apr. 8, 2021

(65) Prior Publication Data
US 2022/0408336 A1 Dec. 22, 2022

(30) Foreign Application Priority Data
Sep. 30, 2019 (CN) .......................... 201910945686.4

(51) Int. Cl.
H04W 24/08 (2009.01)
H04W 24/10 (2009.01)
(Continued)

(52) U.S. Cl.
CPC ......... H04W 36/305 (2018.08); H04W 24/08 (2013.01); H04W 24/10 (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2009/0181676 A1   7/2009   Lee et al.
2018/0343639 A1   11/2018  Zheng et al.
(Continued)

FOREIGN PATENT DOCUMENTS

CN   108605312 A1   9/2018
CN   109962756 A    7/2019
(Continued)

OTHER PUBLICATIONS

Extended search report from corresponding European Patent Application No. 20872108.4 dated Feb. 17, 2023.
(Continued)

*Primary Examiner* — Timothy J Weidner
(74) *Attorney, Agent, or Firm* — Ladas & Parry, LLP

(57) ABSTRACT

The present disclosure provides a method for transmitting a beam failure recovery request, a method for transmitting receiving a beam failure recovery request, a terminal and a base station, the method for transmitting the beam failure recovery request is applied to the terminal and includes: determining at least one first target cell according to a preset priority rule when a beam failure event is detected; sending request information of beam failure recovery on the at least one first target cell.

15 Claims, 4 Drawing Sheets

(51) Int. Cl.
  *H04W 36/00* (2009.01)
  *H04W 36/08* (2009.01)
  *H04W 36/30* (2009.01)
  *H04W 72/044* (2023.01)
  *H04W 72/21* (2023.01)
  *H04W 72/56* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ..... *H04W 36/0072* (2013.01); *H04W 36/085* (2023.05); *H04W 72/046* (2013.01); *H04W 72/21* (2023.01); *H04W 72/56* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC .. H04J 2011/0003–0096; H04L 5/0001–0098; H04W 8/18–245; H04W 16/02–32; H04W 24/02–10; H04W 28/02–26; H04W 36/0005–385; H04W 48/02–20; H04W 72/02–569; H04W 74/002–0891; H04W 76/10–50; H04W 84/02–16; H04W 88/02–12; H04W 92/02–04; H04W 92/10
  See application file for complete search history.

(56) References Cited

U.S. PATENT DOCUMENTS

| | | | |
|---|---|---|---|
| 2019/0052339 A1 | 2/2019 | Zhou et al. | |
| 2019/0089579 A1 | 3/2019 | Sang et al. | |
| 2019/0253986 A1 | 8/2019 | Jeon et al. | |
| 2020/0314722 A1* | 10/2020 | Kyung | H04W 72/21 |
| 2020/0322031 A1 | 10/2020 | You et al. | |
| 2020/0344621 A1 | 10/2020 | Xu et al. | |
| 2020/0404638 A1* | 12/2020 | Deogun | H04W 72/046 |
| 2021/0058804 A1 | 2/2021 | Yang | |
| 2021/0092002 A1* | 3/2021 | Bai | H04W 72/21 |
| 2022/0210683 A1 | 6/2022 | Li | |
| 2022/0337375 A1* | 10/2022 | Li | H04W 72/54 |

FOREIGN PATENT DOCUMENTS

| | | |
|---|---|---|
| CN | 110034799 A | 7/2019 |
| CN | 110167041 A | 8/2019 |
| CN | 110226340 A | 9/2019 |
| WO | 2017132986 A1 | 8/2017 |
| WO | 2019027294 A1 | 2/2019 |
| WO | 2019137472 A1 | 7/2019 |
| WO | 2019174036 A1 | 9/2019 |

OTHER PUBLICATIONS

Partial Supplementary European Search Report for European Patent Application 20872108.4 issued on Oct. 28, 2022.
"On Beam Failure Recovery for SCell," 3GPP TSG-RAN WG1 #97, R1-1907466, Reno, USA, May 13-17, 2019, Agenda Item: 7.2.8.3, Source: Convida Wireless, all pages.
International Search Report for PCT Application PCT/CN2020/114690, issued on Dec. 10, 2020, and its English Translation provided by WIPO.
Written Opinion for PCT Application PCT/CN2020/114690, issued on Dec. 10, 2020, and its English Translation provided by WIPO.
International Preliminary Report on Patentability for PCT Application PCT/CN2020/114690, issued on Apr. 5, 2022, and its English Translation provided by WIPO.
"Summary 2 on L1-SINR and SCell BFR," 3GPP TSG RAN WG1 Meeting #97, Reno, USA, May 13-17, 2019, R1-1907892, Source: Intel Corporation, Agenda item: 7.2.8.3, all pages.
First Office Action for Chinese Patent Application 201910945686.4 issued on Aug. 3, 2022 by the Chinese Patent Office, and its English translation provided by Global Dossier.
"Remaining Issues on Beam Failure Recovery," 3GPP TSG-RAN WG1 Meeting #91, R1-1720072, Reno, USA, Nov. 27-Dec. 1, 2017, Source: Intel Corporation, Agenda item: 7.2.2.4, all pages.
First Office Action for Taiwanese Patent Application 109132027 issued on Jun. 18, 2021 by the Taiwanese Patent Office, and its English translation provided by foreign associate.

* cited by examiner receiving request information of beam failure recovery sent by a terminal on the first target cell ⟋ 41

METHOD FOR TRANSMITTING BEAM FAILURE RECOVERY REQUEST, METHOD FOR RECEIVING BEAM FAILURE RECOVERY REQUEST, TERMINAL AND BASE STATION

CROSS-REFERENCE TO RELATED APPLICATIONS

This application is the U.S. national phase of PCT Application No. PCT/CN2020/114690 filed on Sep. 11, 2020, which claims priority to the Chinese patent application No. 201910945686.4 filed on Sep. 30, 2019, the disclosures of which are incorporated herein by reference in their entireties.

TECHNICAL FIELD

The present disclosure relates to the field of communications technology, in particular to a method for transmitting a beam failure recovery request, a method for receiving a beam failure recovery request, a terminal and a base station.

BACKGROUND

For wireless communication systems, downlink signal transmission by using analog beamforming can achieve a higher beamforming gain and a greater coverage. An important challenge for analog beamforming in high-frequency systems is the large transmission loss and high probability of being blocked. When a Physical Downlink Control Channel (PDCCH) signal is blocked, the terminal will not be able to accurately obtain the control information for downlink transmission, and thus the reception performance will be degraded, such as rate reduction, longer scheduling delay, and user experience degradation.

In a communication system such as Long Term Evolution (LTE), when all downlink beams configured for the PDCCH fail, it is considered that the radio link fails, and a process of radio link reestablishment is started. In addition to increasing the time delay, this method may also cause waste of resources, because by changing a transmission beam and/or a receive beam may make the receiving quality of the downlink control signal meet the requirements. In order to avoid such resource waste and delay, there are currently a beam failure recovery process for a primary cell (PCell) and a beam failure recovery process for a secondary cell (SCell).

If the base station configures a physical uplink shared channel (PUSCH) (i.e. a PUSCH based on a configured grant) for the terminal (UE) in one or more cells (PCell or SCell), the terminal will transmit the medium access control layer control element (MAC-CE) carrying beam failure recovery (BFR) information on the allocated PUSCH resource. Since the base station cannot predict the SCell in which beam failure occurs when configuring the terminal with the granted PUSCH, there may be such a situation: the base station configures the terminal with the granted PUSCH, and the beam failure occurs in the SCell corresponding to the allocated PUSCH resource, when the UE sends the MAC-CE carrying the BFR information on the SCell where the beam failure occurs, the MAC-CE carrying the BFR information sent by the UE may not be correctly received by the base station due to poor uplink beam performance. However, there is currently no specific solution for which cell where the terminal sends the request information for beam failure recovery in the case of beam failure in the SCell.

SUMMARY

An object of the present disclosure is to provide a method for transmitting a beam failure recovery request, a method for receiving a beam failure recovery request, a terminal and a base station, so as to solve the problem in the related art that when the beam failure occurs in a cell, in which cell the terminal transmits the request information of the beam failure recovery.

In a first aspect, an embodiment of the present disclosure provides a method for transmitting a beam failure recovery request, applied to a terminal, including: determining at least one first target cell according to a preset priority rule when a beam failure event is detected; sending request information of beam failure recovery on the at least one first target cell.

Optionally, the determining at least one first target cell according to a preset priority rule includes: determining the at least one first target cell from a first cell set according to the preset priority rule; wherein, the first cell set is a full set or a subset of a set composed of all cells in which a base station has allocated an uplink shared channel PUSCH resource to the terminal; or, the first cell set is a full set or a subset of a set composed of all cells in which the base station configures PUSCH transmission with a configured grant to the terminal.

Optionally, all cells in the first cell set are included in a cell group, the beam failure event occurs for each cell in the cell group.

Optionally, the determining at least one first target cell according to a preset priority rule includes: determining the at least one first target cell according to one priority condition; determining the at least one first target cell according to N priority conditions and priority levels of the N priority conditions, wherein N is a positive integer greater than 1.

Optionally, the determining the at least one first target cell according to N priority conditions and priority levels of the N priority conditions includes:
  step 1: determining a number K1 of cells corresponding to a first priority level according to a priority condition corresponding to the first priority level in the N priority conditions;
  when K1=M, determining that the first target cell is all cells corresponding to the first priority level;
  when K1<M, determining that the first target cell includes all cells corresponding to the first priority level, letting m=2, Xm=M−K1, and performing step 2;
  when K1>M, letting m=2, Xm=M, and performing the step 2;
  wherein, the step 2 includes:
  determining a number Km of cells corresponding to an m-th priority level according to a priority condition corresponding to the m-th priority level in the N priority conditions;
  when Km=Xm, determining that the first target cell includes all cells corresponding to the m-th priority level;
  when m=N and Km>Xm, determining the first target cell from the cells corresponding to the m-th priority level; when m=N and Km<Xm, determining that the first target cell includes all cells corresponding to the m-th priority level, and then stopping determining the at least one target cell continuously or selecting $X_m$−$K_m$ cells from cells which are not determined as the at least one first target cells as the first target cell;

when m<N and Km>Xm, letting m=m+1, repeating step 2;

when m<N and Km<Xm, performing step 3;

wherein, the step 3 includes:

determining that the first target cell includes all cells corresponding to the m-th priority level, letting m=m+1, and Xm=Xm−Km, and repeating step 2.

Optionally, the priority condition includes at least one of the following:

a priority of a cell for which beam failure detection is not implemented being higher than a priority of a cell for which the beam failure detection has been implemented;

a priority of a cell where the beam failure event is not detected being higher than a priority of a cell where the beam failure event has been detected;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency;

a priority of a first cell being higher than priorities of cells other than the first cell in the first target cell set; wherein, the first cell is a cell where the PUSCH resource is located, the PUSCH resource is allocated by the base station according to PUCCH specially configured for BFR transmitted by the terminal; the first target cell set is a set composed of all cells to which the base station has allocated PUSCH resource, or the target cell set is a set composed of at least one cell determined according to a priority condition with a higher priority; or a priority of a second cell being higher than priorities of cells other than the second cell in the second target cell set; wherein, the second cell is a cell where the PUSCH resource is located, the PUSCH resource is allocated by the base station after receiving a beam failure event report sent by the terminal is located; the second target cell set is a set composed of all cells to which the base station has allocated PUSCH resource, or the second target cell set is a set composed of at least one cell determined according to a priority condition with a higher priority.

Optionally, the request information of the beam failure recovery includes: at least one item of indication information of an identifier of a cell in which the beam failure occurs and indication information of a new beam corresponding to a cell in which the beam failure occurs for at least part of beams.

Optionally, the sending the request information of the beam failure recovery on the at least one first target cell comprises:

sending, on the first target cell, the request information of beam failure recovery for a plurality of cells or all cells in which the beam failure occurs.

Optionally, the sending, on the first target cell, the request information of beam failure recovery for a plurality of cells or all cells in which the beam failure occurs includes: in the case that an available PUSCH resource allocated by the base station for the first target cell are less than a resource required for sending the request information of the beam failure recovery, determining at least one second target cell other than the first target cell according to the preset priority rule; sending the request information of the beam failure recovery on the first target cell and the second target cell.

In a second aspect, an embodiment of the present disclosure provides a terminal, comprising: a transceiver, a memory, a processor and a computer program stored in the memory and executed by the processor, the processor implements the following steps when executing the computer program: determining at least one first target cell according to a preset priority rule when a beam failure event is detected; sending request information of beam failure recovery on the at least one first target cell.

Optionally, the processor implements the following step when executing the computer program: determining the at least one first target cell from a first cell set according to the preset priority rule; wherein, the first cell set is a full set or a subset of a set composed of all cells in which a base station has allocated a physical uplink shared channel (PUSCH) resource to the terminal; or, the first cell set is a full set or a subset of a set composed of all cells in which the base station configures PUSCH transmission with a configured grant to the terminal.

Optionally, all cells in the first cell set are included in a cell group, the beam failure event occurs for each cell in the cell group.

Optionally, the processor implements the following steps when executing the computer program: determining the at least one first target cell according to one priority condition; determining the at least one first target cell according to N priority conditions and priority levels of the N priority conditions, wherein N is a positive integer greater than 1.

Optionally, the processor implements the following steps when executing the computer program:

step 1: determining a number K1 of cells corresponding to a first priority level according to a priority condition corresponding to the first priority level in the N priority conditions;

when K1=M, determining that the first target cell is all cells corresponding to the first priority level;

when K1<M, determining that the first target cell includes all cells corresponding to the first priority level, letting m=2, Xm=M−K1, and performing step 2;

when K1>M, letting m=2, Xm=M, and performing the step 2;

wherein, the step 2 includes:

determining a number Km of cells corresponding to an m-th priority level according to a priority condition corresponding to the m-th priority level in the N priority conditions;

when Km=Xm, determining that the first target cell includes all cells corresponding to the m-th priority level;

when m=N and Km>Xm, determining the first target cell from the cells corresponding to the m-th priority level;

when m=N and Km<Xm, determining that the first target cell includes all cells corresponding to the m-th priority level, and then stopping determining the at least one target cell continuously or selecting $X_m - K_m$ cells from cells which are not determined as the at least one first target cells as the first target cell when m<N and Km>Xm, letting m=m+1, repeating step 2;

when m<N and Km<Xm, performing step 3;

wherein, the step 3 includes:

determining that the first target cell includes all cells corresponding to the m-th priority level, letting m=m+1, and Xm=Xm−Km, and repeating step 2.

Optionally, the priority condition includes at least one of the following:
  a priority of a cell for which beam failure detection is not implemented being higher than a priority of a cell for which the beam failure detection has been implemented;
  a priority of a cell where the beam failure event is not detected being higher than a priority of a cell where the beam failure event has been detected;
  a priority of a primary cell being higher than a priority of a secondary cell;
  a priority of a cell with a lower cell index being higher than a priority of a cell with a higher cell index;
  a priority of a cell in a first frequency band being higher than a priority of a cell in a second frequency band;
  a priority of a cell with a lower carrier frequency being higher than a priority of a cell with a higher carrier frequency;
  a priority of a first cell being higher than priorities of cells other than the first cell in the first target cell set; wherein, the first cell is a cell where the PUSCH resource is located, the PUSCH resource is allocated by the base station according to PUCCH specially configured for BFR transmitted by the terminal; the first target cell set is a set composed of all cells to which the base station has allocated the PUSCH resource, or the target cell set is a set composed of at least one cell determined according to a priority condition with a higher priority; or
  a priority of a second cell being higher than priorities of cells other than the second cell in the second target cell set; wherein, the second cell is a cell where the PUSCH resource is located, the PUSCH resource is allocated by the base station after receiving a beam failure event report sent by the terminal; the second target cell set is a set composed of all cells to which the base station has allocated the PUSCH resource, or the second target cell set is a set composed of at least one cell determined according to a priority condition with a higher priority.

Optionally, the request information of the beam failure recovery includes: at least one item of indication information of an identifier of a cell in which the beam failure occurs and indication information of a new beam corresponding to a cell in which the beam failure occurs for at least part of beams.

Optionally, the processor implements the following step when executing the computer program: sending, on the first target cell, the request information of beam failure recovery for a plurality of cells or all cells in which the beam failure occurs.

Optionally, the processor implements the following steps when executing the computer program: in the case that an available PUSCH resource allocated by the base station for the first target cell are less than a resource required for sending the request information of the beam failure recovery, determining at least one second target cell other than the first target cell according to the preset priority rule; sending the request information of the beam failure recovery on the first target cell and the second target cell.

In a third aspect, an embodiment of the present disclosure provides a terminal, including: a determining module, configured to determine at least one first target cell according to a preset priority rule when a beam failure event is detected; a sending module, configured to send request information of beam failure recovery on the at least one first target cell.

In a fourth aspect, an embodiment of the present disclosure provides a computer-readable storage medium with a computer program stored thereon, when a processor execute the computer program, the steps of the method for transmitting the beam failure recovery request.

In a fifth aspect, an embodiment of the present disclosure provides a method for receiving a beam failure recovery request, applied to a base station, including: receiving request information of beam failure recovery sent by a terminal on a first target cell, wherein the first target cell is at least one cell determined by the base station according to a preset priority rule, or at least one cell determined by the terminal according to the preset priority rule.

Optionally, the first target cell is at least one cell determined by the base station from a first cell set according to the preset priority rule, or at least one cell determined by the terminal from the first cell set according to the preset priority rule, wherein, the first cell set is a full set or a subset of a set composed of all cells in which the base station has allocated a physical uplink shared channel (PUSCH) resource to the terminal; or, the first cell set is a full set or a subset of a set composed of all cells in which the base station configures PUSCH transmission with a configured grant to the terminal.

In a sixth aspect, an embodiment of the present disclosure provides a method for receiving a beam failure recovery request, applied to a base station, including: receiving report information of beam failure event sent by a terminal; determining at least one first target cell according to a preset priority rule; allocating a PUSCH resource to the terminal on the first target cell, the PUSCH resource being used for the terminal to transmit request information of beam failure recovery.

Optionally, the determining at least one first target cell according to a preset priority rule includes: determining the at least one first target cell according to one priority condition; or determining the at least one first target cell according to N priority conditions and priority levels of the N priority conditions, wherein N is a positive integer greater than 1.

Optionally, the determining the at least one first target cell according to N priority conditions and priority levels of the N priority conditions includes:
  step 1: determining a number K1 of cells corresponding to a first priority level according to a priority condition corresponding to the first priority level in the N priority conditions;
  when K1=M, determining that the first target cell is all cells corresponding to the first priority level;
  when K1<M, determining that the first target cell includes all cells corresponding to the first priority level, letting m=2, Xm=M−K1, and performing step 2;
  when K1>M, letting m=2, Xm=M, and performing the step 2;
  wherein, the step 2 includes:
  determining a number Km of cells corresponding to an m-th priority level according to a priority condition corresponding to the m-th priority level in the N priority conditions;
  when Km=Xm, determining that the first target cell includes all cells corresponding to the m-th priority level;
  when m=N and Km>Xm, determining the first target cell from the cells corresponding to the m-th priority level; when m=N and Km<Xm, determining that the first target cell includes all cells corresponding to the m-th priority level, and then stopping determining the at least one target cell continuously or selecting $X_m-K_m$ cells from cells which are not determined as the at least one first target cells as the first target cell when m<N and Km>Xm, letting m=m+1, repeating step 2;
when m<N and Km<Xm, performing step 3;
wherein, the step 3 includes:
determining that the first target cell includes all cells corresponding to the m-th priority level, letting m=m+1, and Xm=Xm−Km, and repeating step 2.

Optionally, the priority condition includes at least one of the following:
a priority of a cell where the terminal has not reported the beam failure event is higher than a priority of a cell where the terminal has reported the beam failure event;
a priority of a primary cell being higher than a priority of a secondary cell;
a priority of a cell with a lower cell index being higher than a priority of a cell with a higher cell index;
a priority of a cell in a first frequency band being higher than a priority of a cell in a second frequency band;
a priority of a cell with a lower carrier frequency being higher than a priority of a cell with a higher carrier frequency.

Optionally, the request information of the beam failure recovery includes: at least one item of indication information of an identifier of a cell in which the beam failure occurs and indication information of a new beam corresponding to a cell in which the beam failure occurs for at least part of beams.

In a seventh aspect, an embodiment of the present disclosure provides a base station, including: a transceiver, a memory, a processor, and a computer program stored in the memory and executed by the processor, wherein the processor implements the following steps when executing the computer program: receiving request information of beam failure recovery sent by a terminal on a first target cell, wherein the first target cell is at least one cell determined by the base station according to a preset priority rule, or at least one cell determined by the terminal according to the preset priority rule.

Optionally, the first target cell is at least one cell determined by the base station from a first cell set according to the preset priority rule, or at least one cell determined by the terminal from the first cell set according to the preset priority rule, wherein the first cell set is a full set or a subset of a set composed of all cells in which the base station has allocated a PUSCH resource to the terminal; or, the first cell set is a full set or a subset of a set composed of all cells in which the base station configures PUSCH transmission with a configured grant to the terminal.

In an eighth aspect, an embodiment of the present disclosure provides a base station, including: a transceiver, a memory, a processor, and a computer program stored in the memory and executed by the processor, wherein the processor implements the following steps when executing the computer program: receiving report information of beam failure event sent by a terminal; determining at least one first target cell according to a preset priority rule; allocating a PUSCH resource to the terminal on the first target cell, the PUSCH resource being used for the terminal to transmit request information of beam failure recovery.

Optionally, the processor implements the following steps when executing the computer program: determining the at least one first target cell according to one priority condition; or determining the at least one first target cell according to N priority conditions and priority levels of the N priority conditions, wherein N is a positive integer greater than 1.

Optionally, the processor implements the following steps when executing the computer program:

step 1: determining a number K1 of cells corresponding to a first priority level according to a priority condition corresponding to the first priority level in the N priority conditions;
when K1=M, determining that the first target cell is all cells corresponding to the first priority level;
when K1<M, determining that the first target cell includes all cells corresponding to the first priority level, letting m=2, Xm=M−K1, and performing step 2;
when K1>M, letting m=2, Xm=M, and performing the step 2;
wherein, the step 2 includes:
determining a number Km of cells corresponding to an m-th priority level according to a priority condition corresponding to the m-th priority level in the N priority conditions;
when Km=Xm, determining that the first target cell includes all cells corresponding to the m-th priority level;
when m=N and Km>Xm, determining the first target cell from the cells corresponding to the m-th priority level;
when m=N and Km<Xm, determining that the first target cell includes all cells corresponding to the m-th priority level, and then stopping determining the at least one target cell continuously or selecting $X_m-K_m$ cells from cells which are not determined as the at least one first target cells as the first target cell
when m<N and Km>Xm, letting m=m+1, repeating step 2;
when m<N and Km<Xm, performing step 3;
wherein, the step 3 includes:
determining that the first target cell includes all cells corresponding to the m-th priority level, letting m=m+1, and Xm=Xm−Km, and repeating step 2.

Optionally, the priority condition includes at least one of the following:
a priority of a cell where the terminal has not reported the beam failure event is higher than a priority of a cell where the terminal has reported the beam failure event;
a priority of a primary cell being higher than a priority of a secondary cell;
a priority of a cell with a lower cell index being higher than a priority of a cell with a higher cell index;
a priority of a cell in a first frequency band being higher than a priority of a cell in a second frequency band;
a priority of a cell with a lower carrier frequency being higher than a priority of a cell with a higher carrier frequency.

Optionally, the request information of the beam failure recovery includes: at least one item of indication information of an identifier of a cell in which the beam failure occurs and indication information of a new beam corresponding to a cell in which the beam failure occurs for at least part of beams.

In a ninth aspect, an embodiment of the present disclosure provides a base station, including: a receiving module, configured to receive request information of beam failure recovery sent by a terminal on a first target cell; wherein the first target cell is at least one cell determined by the base station according to a preset priority rule, or at least one cell determined by the terminal according to the preset priority rule.

In a tenth aspect, an embodiment of the present disclosure provides a base station, including: a receiving module, configured to receive report information of beam failure event sent by a terminal; a determining module, configured to determine at least one first target cell according to a preset priority rule; an allocation module, configured to allocate a PUSCH resource to the terminal on the first target cell, the PUSCH resource being used for the terminal to transmit request information of beam failure recovery.

In an eleventh aspect, an embodiment of the present disclosure provides a computer-readable storage medium with a computer program stored thereon, when a processor execute the computer program, the steps of the method for receiving a beam failure recovery request.

The beneficial effect of the above solution is that when a beam failure event is detected, at least one first target cell is determined according to a preset priority rule, request information of beam failure recovery is sent on the at least one first target cell, so as to solve the problem in the related art that when the beam failure occurs in a cell, in which cell the terminal transmits the request information of the beam failure recovery.

DETAILED DESCRIPTION

Figure 1:
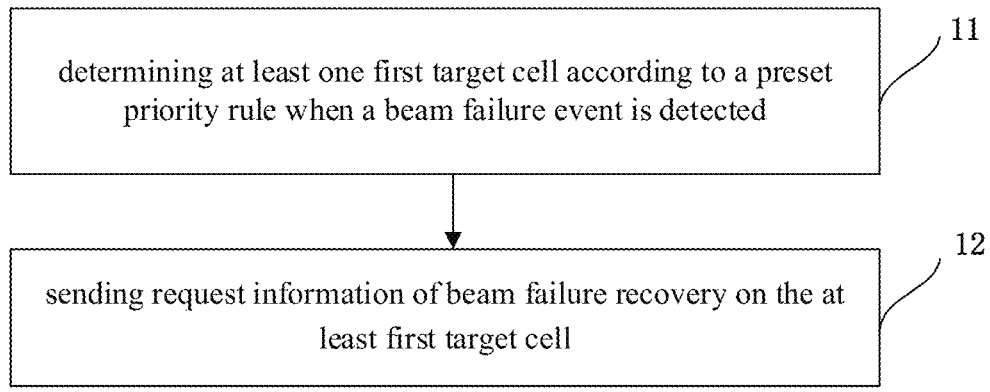
FIG. 1 shows a flowchart of a method for transmitting beam failure recovery request according to an embodiment of the present disclosure.

In order to make the technical problems, technical solutions and advantages to be solved by the present disclosure more clear, detailed description will be given below with reference to the accompanying drawings and specific embodiments. In the following description, specific details such as specific configurations and components are provided merely to assist in a comprehensive understanding of embodiments of the present disclosure. Accordingly, it should be apparent to those skilled in the art that various changes and modifications of the embodiments described herein can be made without departing from the scope and spirit of the present disclosure. Also, descriptions of well-known functions and structures are omitted for clarity and conciseness.

It is to be understood that term "one embodiment" or "an embodiment" means that a particular feature, structure or characteristic associated with the embodiment is included in at least one embodiment of the present disclosure. Thus, the expression "in one embodiment" or "in an embodiment" in various places throughout the application does not necessarily refer to the same embodiment. Furthermore, the particular features, structures or characteristics may be combined in any suitable manner in one or more embodiments.

In various embodiments of the present disclosure, it should be understood that the value of the sequence numbers of the processes does not imply the sequence of execution, and the execution sequence of each process should be determined by the functions and internal logic, the implementation of the present disclosure is not limited.

Additionally, the terms "system" and "network" are often used interchangeably herein.

In the embodiments provided in the present disclosure, it should be understood that "B corresponding to A" means that B is associated with A, and B can be determined according to A. However, it should also be understood that determining B according to A does not mean that B is only determined according to A, and B may also be determined according to A and/or other information.

The embodiments of the present disclosure may be applied to a New Radio (NR) system, an LTE system, a 6G system, and systems of their evolved versions, and the like. The form of access network is not limited, it may include Macro Base Station, Pico Base station, Node B (a 3G mobile base station), eNB, Home eNode B, HeNB, gNB (a 5G mobile base station), relay station, access point, Remote Radio Unit (RRU), Remote Radio Head (RRH) and so on. A user terminal may be a mobile phone (or cell phone), or other device capable of sending or receiving wireless signals, including user equipment, personal digital assistants (PDAs), wireless modems, wireless communication devices, handheld devices, laptop computers, cordless phones, Wireless Local Loop (WLL) station, Customer Premise Equipment (CPE) that can convert mobile signals into WiFi signals, or mobile smart hotspots, smart home appliances, or other devices that can communicate with mobile communication networks spontaneously without human operation, etc.

Specifically, the embodiments of the present disclosure provide a beam failure recovery request transmitting method, which solves the problem in the related art that, when a beam failure occurs in a cell, and there is no specific solution to which cell the terminal sends the beam failure recovery request information.

First Embodiment

As shown in FIG. 1, an embodiment of the present disclosure provides a beam failure recovery request transmitting method, which is applied to a terminal, including:

Step 11: determining at least one first target cell according to a preset priority rule when a beam failure event is detected.

Specifically, a terminal may be configured with one or more SCells after an initial access, and one SCell may be configured as only including downlink (DL), or including DL and uplink (UL), each SCell can perform BFR process. The quality of an uplink beam is usually related to the quality of a downlink beam. Uplink beam management (UL beam management) may have beam correspondence or not. If the uplink and downlink of the UE do not have beam correspondence, the UE selects the uplink transmitting beam independently of the downlink receiving beam. If the uplink and downlink of the UE have beam correspondence, the UE can determine the uplink transmitting beam according to the downlink receiving beam, and the uplink transmitting beam and the downlink receiving beam use the same a spatial filter.

The purpose of the BFR is to measure a downlink beam quality of the downlink control channel PDCCH, or to measure the channel quality of a control resource set (CORESET). The UE performs beam failure detection of the SCell by detecting the quality of the downlink reference signal used for SCell beam failure detection (BFD). The downlink reference signal used for SCell BFD may be explicitly configured through radio resource control (RRC) or implicitly configured through transmission configuration indicator (TCI) state. Each SCell can be configured with up to 8 downlink beams (for example: up to 8 TCI states or up to 8 downlink reference signals for BFD). The beams of the downlink control channel are a subset of active TCI states.

In the case of detecting a beam failure event, the UE sends reporting information of the beam failure event to the base station. Optionally, the reporting information can be sent through a PUCCH resource specially configured for the BFR, such as sending a PUCCH similar to a schedule request (SR); of course, the beam failure event can be reported through another way other than the PUCCH resource specially configured for the BFR, and the present disclosure is not limited to this.

Optionally, when a beam failure event is detected, one first target cell is determined according to the preset priority rule.

Step 12: Sending request information of beam failure recovery on the at least first target cell.

Optionally, the request information of beam failure recovery includes: at least one item of indication information of an identifier of a cell in which the beam failure occurs and indication information of a new beam corresponding to at least part of the cell in which the beam failure occurs.

In the above solution, when a beam failure event is detected, at least one first target cell is determined according to the preset priority rule, and the request information for beam failure recovery is sent through the at least one first target cell. It solves the problem in the related art that in the case of beam failure occurs in a cell, there is no specific solution through which cell the terminal sends the request information for beam failure recovery.

Optionally, the step 11 may specifically include: determining at least one first target cell from a first cell set according to the preset priority rule.

Wherein, as an implementation, the first cell set is a full set or a subset of a set composed of all cells in which the base station has allocated a physical uplink shared channel PUSCH resource to the terminal, that is, the first cell set is a set composed of all cells in which the base station has allocated a physical uplink shared channel PUSCH resource to the terminal, or the first cell set is a set composed of a part of all cells in which the base station has allocated a physical uplink shared channel PUSCH resource to the terminal.

The cell in which PUSCH resource is allocated to the terminal by the base station may be a cell in which available PUSCH resource is allocated by the base station to the terminal, for example: the cell in which the PUSCH resource is allocated by the base station for the terminal according to the PUCCH sent by the terminal for reporting the BFR request, and other cells in which the PUSCH resource exist; or, the cells in which PUSCH resource is allocated to the terminal by the base station may be other cells in which the PUSCH resource is allocated other than the cell in which the PUSCH resource is allocated by the base station according to the SR-like PUCCH configured for BFR.

The available PUSCH resource may be PUSCH resource scheduled by the base station through downlink control information (DCI), configured grant Type 2 of PUSCH resource, and configuration grant type 1 of PUSCH resource. Alternatively, the available PUSCH resource is PUSCH resource allocated by the base station.

As another implementation, the first cell set is a full set or a subset of a set composed of all cells in which the base station configures PUSCH transmission with a configured grant to the terminal. That is, the first cell set may be composed of all cells in which the base station configures the terminal with the PUSCH transmission with a configured grant, or the first cell may be composed of a part of all cells in which the base station configures the terminal with the PUSCH transmission with a configured grant.

Optionally, the cell in which the base station configures the terminal with the PUSCH transmission with a configured grant may be the cell in which the base station configures the terminal with available PUSCH transmission with a configured grant, the available PUSCH transmission with a configured grant may be activated configured grant Type 2 of PUSCH resource and configured grant Type 1 of PUSCH resource. Alternatively, the available PUSCH transmission with a configured grant may be configured grant Type 1 of PUSCH resource.

Further, all cells in the first cell set may be included in a cell group, the beam failure event occurs for each cell in the cell group.

Optionally, the first cell set is the cell group including the SCell in which the beam failure event occurs, for example, a set comprised by all cells for which the PUSCH resource is allocated in the master cell group (MCG) or the secondary cell group (SCG).

Optionally, the first cell set is the cell group including the SCell in which the beam failure event occurs, for example, the MCG or SCG does not include a cell where the PUSCH resource allocated by the base station according to the SR-like PUCCH specially configured for the BFR is located, a cell for which all other existed PUSCH resource is allocated.

Optionally, the first cell set is a cell group including the SCell in which the beam failure event occurs, for example, all cells for which PUSCH transmission with a configured grant are configured in the MCG or SCG.

Optionally, as an implementation, the above step 11 may specifically include: determining at least one first target cell according to a priority condition.

Specifically, determining at least one first target cell according to a priority condition may be that in the case of one priority condition, at least one first target cell is determined according to the priority condition; or in case of a plurality of priority conditions, at least one first target cell is determined according to a priority condition with the highest priority level among the plurality of priority conditions.

Wherein, when the number of at least one cell determined according to the one priority condition satisfies the first preset condition (for example, the number of the first cells is not less than the number of required cells), the required number of cells may be determined from the at least one cell as the first target cell, the specific determination method can be implemented by the UE, which is not specifically limited in this disclosure; in particular, when the number of the at least one cell is the same as the number of the required cells, the at least one cell is directly determined as first target cells.

For example, the priority condition can be the priority of the cell where the beam failure event is not detected is higher than the priority of the cell where the beam failure event is detected; two cells are determined according to the priority condition: cell 1 and cell 2; when the number of required cells is 1, one of the two cells can be selected as the first target cell, for example, cell 1 is selected as the first target cell, or cell 2 is selected as the first target cell; when the number of required cells is 2, it is determined that cell 1 and cell 2 are the first target cells.

It should be noted that, the priority condition may also be other priority conditions, which should not be limited in this embodiment of the present disclosure.

As another implementation, the step 12 may specifically include: determining at least one first target cell according to N priority conditions and priority levels of the priority conditions, where N is a positive integer greater than 1.

Optionally, the determining at least one first target cell according to N priority conditions and priority levels of the priority conditions may be determining at least one cell with the highest priority as the first target cell according to the priority condition with the highest priority level among the N priority conditions.

Optionally, the determining at least one first target cell according to N priority conditions and priority levels of the priority conditions may be achieved by the following steps:

Step 1: determining a number $K_1$ of cells corresponding to a first priority level according to a priority condition corresponding to the first priority level in the N priority conditions;

When $K_1=M$, determining that the first target cell is all cells corresponding to the first priority level;

When $K_1<M$, determining that the first target cell includes all cells corresponding to the first priority level, let m=2, $Xm=M-K_1$, and go to step 2;

When $K_1>M$, let m=2, $X_m=M$, and perform the steps;

Wherein, the step 2 is:

determining a number Km of cells corresponding to an m-th priority level according to the priority condition corresponding to the m-th priority level in the N priority conditions;

When $K_m=X_m$, determining that the first target cell includes all cells corresponding to the m-th priority level;

When m=N and $K_m>X_m$, determining the first target cell from the cells corresponding to the m-th priority level; when m=N and Km<Xm, determining that the first target cell includes all cells corresponding to the m-th priority level, and then stopping determining the at least one target cell continuously or selecting $X_m-K_m$ cells from cells which are not determined as the at least one first target cells as the first target cell When m<N and $K_m>X_m$, let m=m+1, repeat step 2;

When m<N and $K_m<X_m$, go to step 3;

Wherein, the step 3 is:

Determining that the first target cell includes all cells corresponding to the m-th priority level, let m=m+1, let $X_m=X_m-K_m$, and repeat step 2.

For example: the N priority conditions are 3 priority conditions, and the levels from high to low are: a first priority condition, a second priority condition and a third priority condition; M is 1, then the above method can be specifically implemented as:

According to the first priority condition, it is determined to obtain a first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, there are three cases: as a sub-case: if the number of cells in the second target cell set is 1, the cell is determined to be the first target cell, and the process ends (that is, selection is not implemented according to the priority condition of the third priority level); as another sub-case: if the number of cells in the second target cell set is 0, then the third target cell set is determined from the first target cell according to the third priority condition; as a further sub-case, if the number of cells in the second target cell set is 2, the third target cell set is determined from the second target cell set according to the third priority condition;

In the case of obtaining the third target set, it also includes three cases: as a sub-case: if the number of cells in the third target cell set is 1, the cell is determined as the first target cell; as another sub-case: if the number of cells in the third target cell set is 0, a cell is selected from the first target cell set or the second target cell set (if the second target cell set exists) as the first target cell; as another sub-case, if the number of cells in the third target cell set is 2, one of the two cells is selected as the first target cell (wherein, the specific selection method can be implemented by the terminal, which is not specifically limited here);

As the second case: in the case of obtaining the first target cell set, if the number of cells in the first target cell set is 1, then this cell is determined as the first target cell, and the process ends (that is, selection is not implemented according to the second priority condition and third priority condition);

As the third case: when the first target cell set is obtained, if the number of cells in the first target cell set is 0, the second target cell set is directly determined according to the second priority condition (for example, the second target cell set is determined from the first cell set according to the second priority condition); and how to obtain the first target cell after obtaining the second target cell set can refer to the method in the first case, which will not be repeated here.

For another example: the N priority conditions are 2 priority conditions, and the levels from high to low are: the first priority condition, the second priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, as a sub-case: if the number of cells in the second target cell set is 2 (of course it may be 3), then one of the two cells is selected as the first target cell (wherein, the specific selection method can be implemented by the terminal, which is not specifically limited here); as another sub-case: if the number of cells in the second target cell set is 1, then this cell is determined as the first target cell; as another sub-case: if the number of cells in the second target cell set is 0, a cell is selected from the first target cell set as the first target cell;

As the second case: in the case of obtaining the first target cell set, if the number of cells in the first target cell set is 1, then determining this cell as the first target cell;

As the third case: when the first target cell set is obtained, if the number of cells in the first target cell set is 0, this cell can be directly determined as the first target cell, or the second target cell set is directly determined according to the second priority condition (for example, the second target cell set can be determined from the first cell set according to the second priority condition); and how to obtain the first target cell after obtaining the second target cell set refers to the method in the first case, which will not be repeated here.

Optionally, determining at least one first target cell according to the N priority conditions and the priority levels of the priority conditions can also be achieved by the following steps:

Step 1: determining that a set composed of cells with the highest priority is the i-th target cell set according to the priority condition corresponding to the i=1 priority level in the N priority conditions;

In the case that the number of cells in the i-th target cell set satisfies a first preset condition, determining that at least one cell in the i-th target cell set is the first target cell;

In the case that the number of cells in the i-th target cell set does not meet the first preset condition and does not meet a second preset condition, the following step 2 is performed;

When the number of cells in the i-th target cell set does not meet the first preset condition and meets the second preset condition, determining a set composed by cells with the highest priority is the i-th target cell set according to the priority condition corresponding to the (i+1)th priority level in the N priority conditions, and repeating the above steps of determining the i-th target cell set;

Step 2: determining at least one cell from the i-th target cell set as the (i+1)th target cell set according to the priority condition corresponding to the (i+1)th priority level in the N priority conditions; wherein, i is a positive integer, i is less than N;

When i+1 is less than N, and in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set as the first target cell; when the number of cells in the (i+1)th target cell set does not meet the first preset condition and the second preset condition, making i=i+1 and repeating the step 2;

In the case that i+1 is equal to N, in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least cell in the (i+1)th target cell set and the i-th target cell set is determined as the first target cell.

The first preset condition may be that the number of cells in the cell set is equal to the number of the at least one first target cells, and the second preset condition may be that the number of cells in the cell set is lower than the number of required cells.

For example: the N priority conditions are 3 priority conditions, and the levels from high to low are: the first priority condition, the second priority condition and the third priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, there are three cases: as a sub-case: if the number of cells in the second target cell set is 1, the cell is determined to be the first target cell, and the process ends (that is, selection is not implemented according to the priority condition of the third priority level); as another sub-case: if the number of cells in the second target cell set is 0, then a cell is selected from the first target cell set as the first target cell; as another sub-case, if the number of cells in the second target cell set is 2, the third target cell set is determined from the second target cell set according to the third priority condition;

In the case of obtaining the third target set, it also includes three cases: as a sub-case: if the number of cells in the third target cell set is 1, the cell is determined as the first target cell; as another sub-case: if the number of cells in the third target cell set is 0, a cell is selected from the first target cell set as the first target cell; as another sub-case, if the number of cells in the second target cell set is 2, then one of the two cells is selected as the first target cell (wherein, the specific selection method can be implemented by the terminal, which is not specifically limited here);

As the second case: in the case of obtaining the first target cell set, if the number of cells in the first target cell set is 1, then this cell is determined as the first target cell, and the process ends (that is, selection is not implemented according to the second priority condition and third priority condition);

As the third case: when the first target cell set is obtained, if the number of cells in the first target cell set is 0, a cell can be directly determined from the cells to be selected (such as the first cell set) as the first target cell, or the second target cell set is directly determined according to the second priority condition (for example, the second target cell set may be determined from the first cell set according to the second priority condition); and then how to obtain the first target cell after obtaining the second target cell set refers to the first case, which will not be repeated here.

For another example: the N priority conditions are 2 priority conditions, and the levels from high to low are: the first priority condition, the second priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, as a sub-case: if the number of cells in the second target cell set is 2 (of course it may be 3), then one of the two cells is selected as the first target cell (wherein, the specific selection method can be realized by the terminal, which is not specifically limited here); as another sub-case: if the number of cells in the second target cell set is 1, then this cell is determined as the first target cell; as another sub-case: if the number of cells in the second target cell set is 0, a cell is selected from the first target cell set as the first target cell;

As the second case: in the case of obtaining the first target cell set, if the number of cells in the first target cell set is 1, then this cell is determined as the first target cell;

As the third case: when the first target cell set is obtained, if the number of cells in the first target cell set is 0, this cell can be directly determined as the first target cell, or the second target cell set is directly determined according to the second priority condition (for example, the second target cell set can be determined from the first cell set according to the second priority condition); and how to obtain the first target cell after obtaining the second target cell set refers to the first case, which will not be repeated here.

The above method is described in detail below in conjunction with specific examples:

Example 1: The priority condition of the first priority level is: the priority of the cell where the beam failure event is not detected is higher than the priority of the cell where the beam failure event is detected;

The priority condition of the second priority level is: the priority of the primary cell is higher than the priority of the secondary cell;

Wherein, the first priority level is higher than the second priority level;

Scenario 1: The candidate cells include a PCell and an SCell, and neither the PCell nor an SCell detects a beam failure event;

According to the priority condition of the first priority level, the determined at least one cell includes: a PCell and one SCell, then it is determined that the cell set formed by the PCell and the SCell is the first target cell set;

If the number of required cells is 2, that is, the number of cells in the first target cell set satisfies the first preset condition, then determining that the PCell and the SCell are the first target cells;

If the number of required cells is 1, that is, the number of cells in the first target cell set does not meet the first preset condition, determining one cell from the first target cell set according to the priority condition of the second priority level, the one cell is PCell; then the PCell is determined to be the first target cell.

Scenario 2: The candidate cells include a PCell and one SCell, and the PCell detects a beam failure event, but the SCell does not detect a beam failure event;

According to the priority condition of the first priority level, the determined at least one cell includes: the SCell, then it is determined that the cell set composed by the SCell is the first target cell set;

If the number of required cells is 1, that is, the number of cells in the first target cell set satisfies the first preset condition, the SCell is determined to be the first target cell.

If the number of required cells is 2, one cell can be determined from all candidate cells according to the priority condition of the second priority level, and the cell can be used together with the SCell as the first target cell.

Scenario 3: The candidate cells include a PCell and one SCell, and the PCell has detected a beam failure event;

According to the priority condition of the first priority level, the determined number of cells is 0; then the cell set composed of the PCell and the one SCell can be used as the first target cell set;

According to the priority condition of the first priority level, at least one cell determined from the first target cell set is the PCell;

If the number of required cells is 1, the PCell is determined to be the first target cell.

Example 2: The priority condition of the first priority level is: the priority of the cells in the first frequency band is higher than that of the cells in the second frequency band;

The priority condition of the second priority level is: the priority of the cell where the beam failure event is not detected is higher than the priority of the cell where the beam failure event is detected;

The priority condition of the third priority level is: the priority of a cell with a lower cell sequence number is higher than that of a cell with a higher cell sequence number;

Scenario 1: The candidate cells are: Cell 1, Cell 2, Cell 3, and Cell 4, where the frequency bands of Cell 1 and Cell 3 are Frequency Range 1 (FR 1 in the 5G NR system), the frequency band of Cell 2 and Cell 4 are Frequency Range 2 (FR 2 in the 5G NR system); no beam failure event was detected in cell 1, cell 2, and cell 4, and a beam failure event was detected in cell 3; the required number of cells is 1;

According to the priority condition of the first priority level, the determined at least one cell is: cell 1 and cell 3; then the set formed by cell 1 and cell 3 is taken as the first target cell set;

According to the priority condition of the second priority level, at least one cell determined from the first target cell set is: cell 1, and cell 1 is taken as the first target cell.

Scenario 2: The candidate cells are: Cell 1, Cell 2, Cell 3, and Cell 4. The frequency bands of Cell 1 and Cell 3 are Frequency Range 1 (FR 1), and the frequency bands of Cell 2 and Cell 4 are Frequency Range 2 (FR 2); no beam failure event was detected in cell 1, cell 2, and cell 4, and a beam failure event was detected in cell 3; the required number of cells is 2;

According to the priority condition of the first priority level, the determined at least one cell is: cell 1 and cell 3; then the set formed by cell 1 and cell 3 is taken as the first target cell set;

According to the priority condition of the second priority level, at least one cell determined from the first target cell set is: cell 1, then according to the cell 1 and the first target cell set, the second target cell set is determined as: Cell 1, Cell 3;

According to the priority condition of the third priority level, two cells are selected from the second target cell set, namely, cell 1 and cell 3.

Optionally, although several examples of priority conditions are given above, it should be understood that the above examples are used to illustrate the method for determining the first target cell, that is, in addition to the above setting of the priority conditions and the priority levels, the priority condition can also be set: the priority of the primary cell is higher than that of the secondary cell, and there is always the highest priority level, that is, when the PUSCH resource is allocated on the PCell, the UE always sends BFR information on the PCell, the embodiments of the present disclosure are not limited thereto.

Optionally, the priority condition includes at least one of the following:

a priority of a cell for which beam failure detection is not implemented being higher than a priority of a cell for which the beam failure detection has been implemented;

a priority of a cell where the beam failure event is not detected being higher than a priority of a cell where the beam failure event has been detected;

a priority of a primary cell being higher than a priority of a secondary cell (for example: the priority of the primary cell is higher than a priority of a main secondary cell, the priority of the main secondary cell is higher than that of the secondary cell; or the priority of the primary cell is the same as the priority of the main secondary cell, and the priority of the main secondary cell is higher than that of the secondary cell);

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency;

a priority of a first cell being higher than priorities of cells other than the first cell in the first target cell set; wherein, the first cell is a cell where the PUSCH resource allocated by the base station according to the PUCCH specially configured for the BFR transmitted by the terminal is located; the first target cell set is a set composed of all cells to which the base station has allocated PUSCH resource, or the target cell set is a set composed of at least one cell determined according to a priority condition with a higher priority (the priority condition with higher priority may refer to: among the plurality of priority conditions including a priority condition that the priority of the first cell is higher than the priority of cells other than the first cell in the first target cell set, other priority conditions having a higher level than the priority condition that the priority of the first cell is higher than the priority of cells other than the first cell in the first target cell set); or a priority of a second cell being higher than priorities of cells other than the second cell in the second target cell set; wherein, the second cell is a cell where the PUSCH allocated by the base station after receiving the beam failure event report sent by the terminal; the second target cell set is a set composed of all cells to which the base station has allocated PUSCH resource, or the second target cell set is a set composed of at least one cell determined according to a priority condition with a higher priority (the priority condition with higher priority may refer to: among the plurality of priority conditions including a priority condition that the priority of the second cell is higher than the priority of cells other than the second cell in the second target cell set, other priority conditions having a higher level than the priority condition that the priority of the second cell is higher than the priority of cells other than the second cell in the second target cell set).

Optionally, the above priority conditions are used in combination, that is, when a plurality of priority conditions are used to determine at least one target cell, the plurality priority conditions may not include: a priority of a cell for which beam failure detection is not implemented being higher than a priority of a cell for which the beam failure detection has been implemented; and a priority of a cell where the beam failure event is not detected being higher than a priority of a cell where the beam failure event has been detected; or the plurality of priority conditions include a priority of a cell for which beam failure detection is not implemented being higher than a priority of a cell for which the beam failure detection has been implemented; or the plurality of priority conditions include a priority of a cell where the beam failure event is not detected being higher than a priority of a cell where the beam failure event has been detected.

Optionally, the above priority conditions are used in combination, that is, when a plurality of priority conditions are used to determine at least one target cell, the plurality priority conditions may not include: the priority of the primary cell is higher than a priority of a main secondary cell, the priority of the main secondary cell is higher than that of the secondary cell; and the priority of the primary cell is the same as the priority of the main secondary cell, and the priority of the main secondary cell is higher than that of the secondary cell; Alternatively, the plurality of priority conditions may include: the priority of the primary cell is higher than a priority of a main secondary cell, the priority of the main secondary cell is higher than that of the secondary cell; or the plurality of priority conditions may include the priority of the primary cell is the same as the priority of the main secondary cell, and the priority of the main secondary cell is higher than that of the secondary cell.

In particular, when at least one first target cell is determined using the priority condition that a priority of a cell where the beam failure event is not detected is higher than a priority of a cell where the beam failure event has been detected, it can prevent UE from sending the beam failure recovery request on a cell for which the beam failure occurs, so as to avoid the problem that the beam failure recovery request may not be received by the base station due to the beam failure recovery request sent on the cell for which the beam failure occurs, which is beneficial to improve the transmission reliability of the beam failure recovery request.

Optionally, the step 12 may specifically include: sending, on the first target cell, request information of beam failure recovery for a plurality of cells or all cells in which the beam failure occurs.

Optionally, the UE may jointly send the beam failure recovery request information for all cells for which the beam failure occurs (for example, sent only on the first target cell, or sent on the first target cell and other cells).

Optionally, the UE may separately send beam failure recovery request information for each cell for which the beam failure occurs. (For example, for each cell for which beam failure occurs, at least one first target cell may be determined by using the method of at least one of the above embodiments, and request information for beam failure recovery may be sent on the first target cell).

Further, sending the request information of the beam failure recovery of a plurality of cells with beam failures or all cells with beam failures on the first target cell may specifically include:

In the case that available PUSCH resource allocated by a base station for a first target cell are less than resource required for sending the request information of beam failure recovery, determining at least one second target cell other than the first target cell according to a preset priority rule;

Sending the request information of the beam failure recovery on the first target cell and the second target cell.

Specifically, the UE may jointly send multiple request information of the beam failure recovery in the same cell. When the PUSCH resource allocated by the base station for the cell with the highest priority determined according to the priority rule are less than the resource required by the request information of the beam failure recovery, the UE can send the request information of beam failure recovery on the cell with the highest priority among the cells carrying the resource of the request information of the beam failure recovery.

When the PUSCH resource allocated by the base station to the cell with the highest priority determined according to the priority rule in the above-mentioned embodiment are less than the resource required for reporting the request information of beam failure recovery of all cells in which the beam failure event has occurred, the UE sends a part of request information of the beam failure recovery on the cell with the highest priority, and sends the remaining request information of beam failure recovery request information in the cell with the second highest priority (which can be at least one cell determined from the first cell set except the cell with the first highest priority according to the priority rule). This method can be extended to more cells. For example, when the remaining request information of the beam failure recovery cannot be completely transmitted on the cell with the second highest priority, a part of the request information which is remained after sending on the cell with the second highest priority is sent on the cell with the third highest priority (which can be at least one cell determined from the first cell set except the cell with the first highest priority and the cell with the second highest priority according to the priority rule), and so on, until the request information of the beam failure recovery request information can be completely sent.

The above describes the method for transmitting a beam failure recovery request of the present disclosure, and a corresponding terminal will be further described in this embodiment below with reference to the accompanying drawings.

Figure 2:
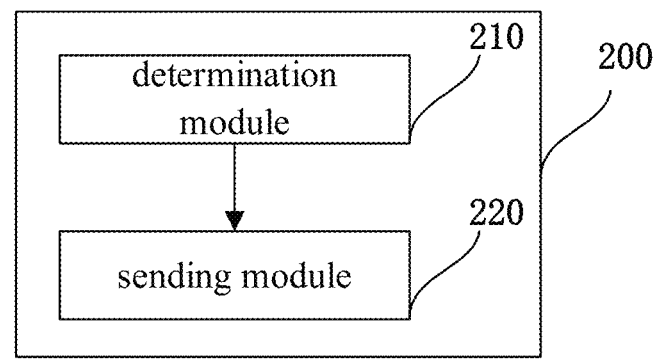
FIG. 2 shows a block diagram of a terminal according to an embodiment of the present disclosure.

Specifically, as shown in FIG. 2, a terminal 200 according to an embodiment of the present disclosure includes:

a determination module 210, configured to determine at least one first target cell according to a preset priority rule when a beam failure event is detected;

a sending module 220, configured to send request information of beam failure recovery on the at least one first target cell.

Optionally, the determining module 210 includes:

a first determination sub-module, configured to determine at least one first target cell from a first cell set according to the preset priority rule;

Wherein, the first cell set is a full set or a subset of a set composed of all cells in which the base station has allocated a physical uplink shared channel PUSCH resource to the terminal; or, the first cell set is a full set or a subset of a set composed of all cells in which the base station configures PUSCH transmission with a configured grant to the terminal.

Optionally, all cells in the first cell set may be included in a cell group, the beam failure event occurs for each cell in the cell group.

Optionally, the determining module 210 includes:

a second determination sub-module, configured to determine at least one first target cell according to one priority condition;

a third determination sub-module, configured to determine at least one first target cell according to N priority conditions and priority levels of the N priority conditions, wherein N is a positive integer greater than 1.

Optionally, the third determination sub-module is specifically used for:

Step 1: determining a number $K_1$ of cells corresponding to a first priority level according to a priority condition corresponding to the first priority level in the N priority conditions;

When $K_1=M$, determining that the first target cell is all cells corresponding to the first priority level;

When $K_1<M$, determining that the first target cell includes all cells corresponding to the first priority level, let m=2, $X_m=M-K_1$, and go to step 2;

When $K_1>M$, let m=2, $X_m=M$, and perform the steps;

Wherein, the step 2 is:

determining a number Km of cells corresponding to an m-th priority level according to the priority condition corresponding to the m-th priority level in the N priority conditions;

When $K_m=X_m$, determining that the first target cell includes all cells corresponding to the m-th priority level;

When m=N and $K_m>X_m$, determining the first target cell from the cells corresponding to the m-th priority level; when m=N and $Km<X_m$, determining that the first target cell includes all cells corresponding to the m-th priority level, and then stopping determining the at least one target cell continuously or selecting $X_m-K_m$ cells from cells which are not determined as the at least one first target cells as the first target cell When m<N and $K_m>X_m$, let m=m+1, repeat step 2;

When m<N and $Km<X_m$, go to step 3;

Wherein, the step 3 is:

Determining that the first target cell includes all cells corresponding to the m-th priority level, let m=m+1, let $X_m=X_m-K_m$, and repeat step 2.

Optionally, the priority condition includes at least one of the following:

a priority of a cell for which beam failure detection is not implemented being higher than a priority of a cell for which the beam failure detection has been implemented;

a priority of a cell where the beam failure event is not detected being higher than a priority of a cell where the beam failure event has been detected;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency;

a priority of a first cell being higher than priorities of cells other than the first cell in the first target cell set; wherein, the first cell is a cell where the PUSCH resource allocated by the base station according to the PUCCH specially configured for the BFR transmitted by the terminal is located; the first target cell set is a set composed of all cells to which the base station has allocated PUSCH resource, or the target cell set is a set composed of at least one cell determined according to a priority condition with a higher priority; or a priority of a second cell being higher than priorities of cells other than the second cell in the second target cell set; wherein, the second cell is a cell where the PUSCH allocated by the base station after receiving the beam failure event report sent by the terminal; the second target cell set is a set composed of all cells to which the base station has allocated PUSCH resource, or the second target cell set is a set composed of at least one cell determined according to a priority condition with a higher priority.

Optionally, the request information of beam failure recovery includes: at least one item of indication information of an identifier of a cell in which the beam failure occurs and indication information of a new beam corresponding to a cell in which the beam failure occurs for at least part of beams.

Optionally, the sending module 220 includes:

A sending sub-module, configured to send, on the first target cell, request information of beam failure recovery for a plurality of cells or all cells in which the beam failure occurs.

Optionally, the sending sub-module includes:

a third determining unit, configured to, in the case that available PUSCH resource allocated by a base station for a first target cell are less than resource required for sending the request information of beam failure recovery, determine at least one second target cell other than the first target cell according to a preset priority rule;

A sending unit, configured to send the request information of the beam failure recovery on the first target cell and the second target cell.

The terminal embodiments of the present disclosure correspond to the method embodiments, and all the implementation in the method embodiments are applicable to the embodiments of the network device, and the same technical effects can also be achieved.

In this embodiment, when a beam failure event is detected, the terminal 200 determines at least one first target cell according to a preset priority rule, and the request information of the beam failure recovery is sent through the at least one first target cell. It solves the problem in the related art that in the case of beam failure in a cell, there is no specific solution for the terminal to send the request information of beam failure recovery.

Figures 3, 4:
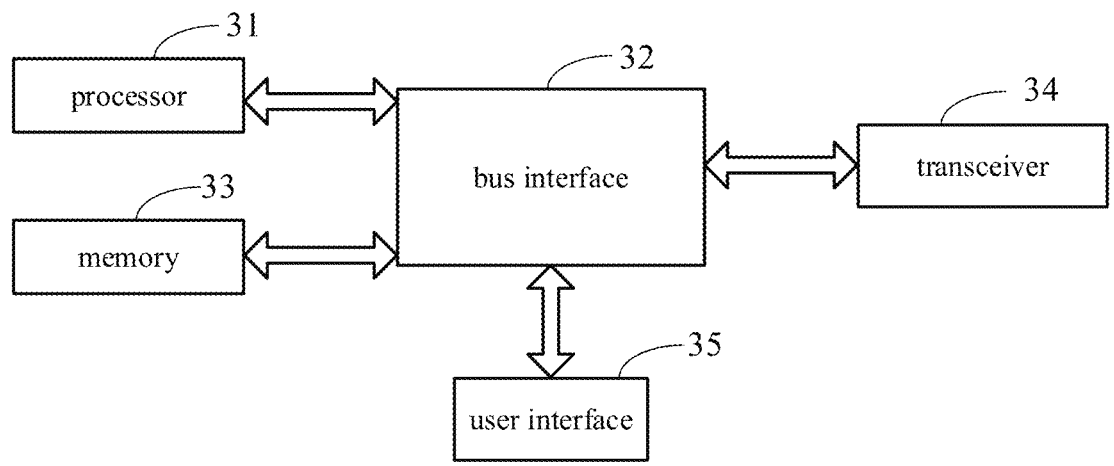
FIG. 3 shows a structural block diagram of a terminal according to an embodiment of the present disclosure.
FIG. 4 shows a flowchart of a method for receiving a beam failure recovery request according to an embodiment of the present disclosure.

As shown in FIG. 3, this embodiment provides a terminal, including:
   a processor 31; and a memory 33 connected to the processor 31 through a bus interface 32, the memory 33 is used to store programs and data used by the processor 31 when performing operations, when the processor 31 calls and executes the programs and data stored in the memory 33, the following processes are executed.

The transceiver 34 is connected to the bus interface 32 for receiving and transmitting data under the control of the processor 31.

Specifically, the processor 31 implements the following steps when executing the computer program:
   determining at least one first target cell according to a preset priority rule when a beam failure event is detected;
   sending request information of beam failure recovery on the at least one first target cell.

Wherein, the processor 31 also implements the following steps when executing the computer program:
   determining at least one first target cell from a first cell set according to the preset priority rule;
   Wherein, the first cell set is a full set or a subset of a set composed of all cells in which the base station has allocated a physical uplink shared channel PUSCH resource to the terminal; or,
   the first cell set is a full set or a subset of a set composed of all cells in which the base station configures PUSCH transmission with a configured grant to the terminal.

Optionally, all cells in the first cell set may be included in a cell group, the beam failure event occurs for each cell in the cell group.

Wherein, the processor 31 also implements the following steps when executing the computer program:
   determining at least one first target cell according to one priority condition; or
   determining at least one first target cell according to N priority conditions and priority levels of the N priority conditions, wherein N is a positive integer greater than 1.

Wherein, the processor 31 also implements the following steps when executing the computer program:
   Step 1: determining a number $K_1$ of cells corresponding to a first priority level according to a priority condition corresponding to the first priority level in the N priority conditions;
   When $K_1=M$, determining that the first target cell is all cells corresponding to the first priority level;
   When $K_1<M$, determining that the first target cell includes all cells corresponding to the first priority level, let m=2, $X_m=M-K_1$, and go to step 2;
   When $K_1>M$, let m=2, $X_m=M$, and perform the steps;
   Wherein, the step 2 is:
   determining a number Km of cells corresponding to an m-th priority level according to the priority condition corresponding to the m-th priority level in the N priority conditions;
   When $K_m=X_m$, determining that the first target cell includes all cells corresponding to the m-th priority level;
   When m=N and $K_m>X_m$, determining the first target cell from the cells corresponding to the m-th priority level; when m=N and $K_m<X_m$, determining that the first target cell includes all cells corresponding to the m-th priority level, and then stopping determining the at least one target cell continuously or selecting $X_m-K_m$ cells from cells which are not determined as the at least one first target cells as the first target cell
   When m<N and $K_m>X_m$, let m=m+1, repeat step 2;
   When m<N and $K_m<X_m$, go to step 3;
   Wherein, the step 3 is:
   Determining that the first target cell includes all cells corresponding to the m-th priority level, let m=m+1, let $X_m=X_m-K_m$, and repeat step 2.

Wherein, the priority condition includes at least one of the following:
   a priority of a cell for which beam failure detection is not implemented being higher than a priority of a cell for which the beam failure detection has been implemented;
   a priority of a cell where the beam failure event is not detected being higher than a priority of a cell where the beam failure event has been detected;
   a priority of a primary cell being higher than a priority of a secondary cell;
   a priority of a cell with a lower cell index being higher than a priority of a cell with a higher cell index;
   a priority of a cell in a first frequency band being higher than a priority of a cell in a second frequency band;
   a priority of a cell with a lower carrier frequency being higher than a priority of a cell with a higher carrier frequency;
   a priority of a first cell being higher than priorities of cells other than the first cell in the first target cell set; wherein, the first cell is a cell where the PUSCH resource allocated by the base station according to the PUCCH specially configured for the BFR transmitted by the terminal is located; the first target cell set is a set composed of all cells to which the base station has allocated PUSCH resource, or the target cell set is a set composed of at least one cell determined according to a priority condition with a higher priority; or a priority of a second cell being higher than priorities of cells other than the second cell in the second target cell set; wherein, the second cell is a cell where the PUSCH allocated by the base station after receiving the beam failure event report sent by the terminal; the second target cell set is a set composed of all cells to which the base station has allocated PUSCH resource, or the second target cell set is a set composed of at least one cell determined according to a priority condition with a higher priority.

Optionally, the request information of beam failure recovery includes: at least one item of indication information of an identifier of a cell in which the beam failure occurs and indication information of a new beam corresponding to a cell in which the beam failure occurs for at least part of beams.

Wherein, the processor 31 also implements the following steps when executing the computer program:

Sending, on the first target cell, request information of beam failure recovery for a plurality of cells or all cells in which the beam failure occurs.

Wherein, the processor 31 also implements the following steps when executing the computer program:

in the case that available PUSCH resource allocated by a base station for a first target cell are less than resource required for sending the request information of beam failure recovery, determining at least one second target cell other than the first target cell according to a preset priority rule;

Sending the request information of the beam failure recovery on the first target cell and the second target cell.

It should be noted that, in FIG. 3, the bus architecture may include any number of interconnected buses and bridges, specifically, various circuits of one or more processors represented by the processor 31 and the memory represented by the memory 33 are linked together. The bus architecture may also link together various other circuits, such as peripherals, voltage regulators, and power management circuits, which are well known in the art and, therefore, will not be described further herein. The bus interface provides an interface. Transceiver 34 may be multiple elements, i.e., including a transmitter and a receiver, units for communicating with various other devices over a transmission medium. For different terminals, the user interface 35 may also be an interface capable of externally or internally connecting the required equipment, and the connected equipment includes but is not limited to a keypad, a display, a speaker, a microphone, a joystick, and the like. The processor 41 is responsible for managing the bus architecture and general processing, and the memory 33 may store data used by the processor 31 in performing operations.

Those skilled in the art can understand that all or part of the steps of implementing the above embodiments can be completed by hardware, or can be completed by instructing relevant hardware through a computer program, where the computer program includes instructions for executing part or all of the steps of the above method; and the computer program can be stored in a readable storage medium, and the storage medium can be any form of storage medium.

Embodiments of the present disclosure further provide a computer-readable storage medium, where a computer program is stored on the computer-readable storage medium. When the computer program is executed by a processor, each process of the foregoing method for transmitting a beam failure recovery request on the terminal side is implemented. The same technical effect is achieved, in order to avoid repetition, it is not repeated here. The computer-readable storage medium is, for example, a read-only memory (ROM), a random access memory (RAM), a magnetic disk, or an optical disk.

The method for transmitting a beam failure recovery request according to an embodiment of the present disclosure has been described above from the terminal side, and the method for receiving a beam failure recovery request at the base station side will be further described below with reference to the accompanying drawings.

As shown in FIG. 4, an embodiment of the present disclosure provides a method for receiving a beam failure recovery request, applied to a base station, including:

Step 41: Receiving request information of beam failure recovery sent by a terminal on the first target cell.

The first target cell is: at least one cell determined by the base station according to a preset priority rule, or at least one cell determined by the terminal according to the preset priority rule.

Optionally, when the first target cell is at least one cell determined by the terminal according to the preset priority rule, the base station may receive the request information of the beam failure recovery on all cells.

Optionally, the terminal and the base station may use the same priority rule to determine the first target cell respectively, that is, the terminal sends the request information of beam failure recovery on the first target cell determined by using the priority rule, and the base station may also receive the request information of the beam failure recovery on the first target cell determined by the same priority rule, which is beneficial to improve the receiving efficiency.

The first target cell is: at least one cell determined by the base station from the first cell set according to the preset priority rule, or at least one cell determined by the terminal from the first cell set according to the preset priority rule;

Wherein, as an implementation, the first cell set is a full set or a subset of a set composed of all cells in which the base station has allocated a physical uplink shared channel PUSCH resource to the terminal, that is, the first cell set is a set composed of all cells in which the base station has allocated a physical uplink shared channel PUSCH resource to the terminal, or the first cell set is a set composed of a part of all cells in which the base station has allocated a physical uplink shared channel PUSCH resource to the terminal.

The cell in which PUSCH resource is allocated to the terminal by the base station may be a cell in which available PUSCH resource is allocated by the base station to the terminal, for example: the cell in which the PUSCH resource is allocated by the base station for the terminal, and other cells in which the PUSCH resource exist; or, the cells in which PUSCH resource is allocated to the terminal by the base station may be other cells in which the PUSCH resource is allocated other than the cell in which the PUSCH resource is allocated by the base station according to the SR-like PUCCH configured for BFR.

The available PUSCH resource may be PUSCH resource scheduled by the base station through downlink control information (DCI), configured grant Type 2 of PUSCH resource, and configuration grant type 1 of PUSCH resource.

Alternatively, the available PUSCH resource is PUSCH resource allocated by the base station.

As another implementation, the first cell set is a full set or a subset of a set composed of all cells in which the base station configures PUSCH transmission with a configured grantPUSCH transmission with a configured grant to the terminal. That is, the first cell set may be composed of all cells in which the base station configures the terminal with the PUSCH transmission with a configured grant, or the first cell may be composed of a part of all cells in which the base station configures the terminal with the PUSCH transmission with a configured grant.

Optionally, the cell in which the base station configures the terminal with the PUSCH transmission with a configured grant may be the cell in which the base station configures the terminal with available PUSCH transmission with a configured grant, the available PUSCH transmission with a configured grant may be activated configured grant Type 2 of PUSCH resource and configured grant Type 1 of PUSCH resource. Alternatively, the available PUSCH transmission with a configured grant may be configured grant Type 1 of PUSCH resource.

Wherein, when the first target cell is at least one cell determined by the terminal from the first cell set according to the preset priority rule, all cells in the first cell set may be included in a cell group, the beam failure event occurs for each cell in the cell group.

Optionally, the first cell set is the cell group including the SCell in which the beam failure event occurs, for example, a set comprised by all cells for which the PUSCH resource is allocated in the master cell group (MCG) or the secondary cell group (SCG).

Optionally, the first cell set is the cell group including the SCell in which the beam failure event occurs, for example, the MCG or SCG does not include a cell where the PUSCH resource allocated by the base station according to the SR-like PUCCH specially configured for the BFR is located, a cell for which all other existed PUSCH resource is allocated.

Optionally, the first cell set is a cell group including the SCell in which the beam failure event occurs, for example, all cells for which PUSCH transmission with a configured grant are configured in the MCG or SCG.

Figure 5:
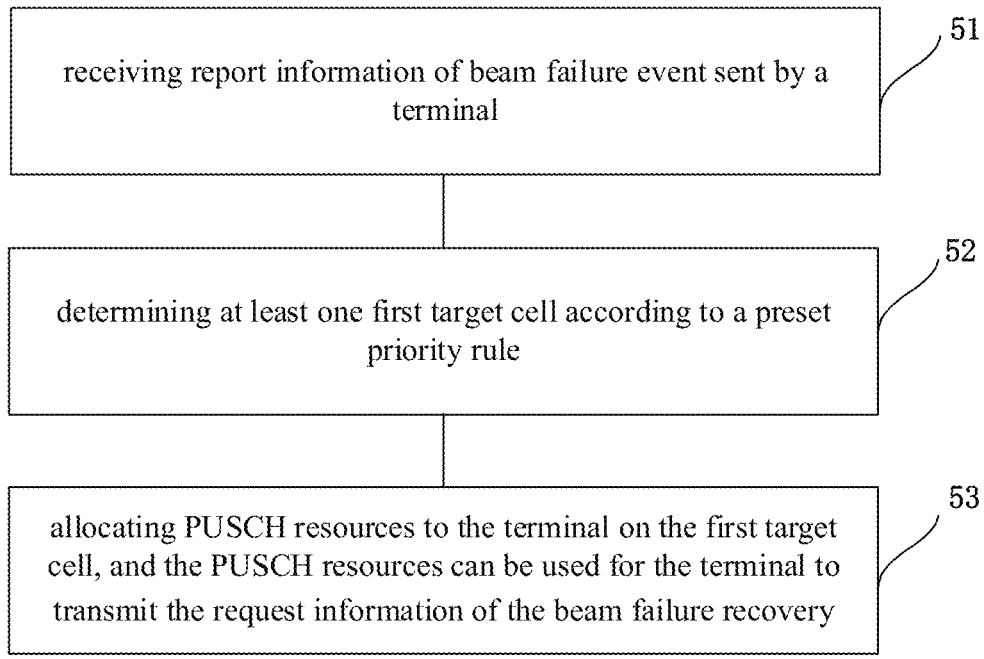
FIG. 5 shows another flowchart of a method for receiving a beam failure recovery request according to an embodiment of the present disclosure.

As shown in FIG. 5, an embodiment of the present invention further provides a method for receiving a beam failure recovery request, which is applied to a base station, including:

Step 51: Receiving report information of beam failure event sent by a terminal.

In this embodiment, when the terminal detects that a beam failure event occurs, the terminal reports the reporting information of the beam failure event to the base station.

Step 52: Determining at least one first target cell according to a preset priority rule.

Step 53: Allocating PUSCH resource to the terminal on the first target cell, and the PUSCH resource can be used for the terminal to transmit the request information of the beam failure recovery.

In this embodiment, the terminal may send the request information of beam failure recovery on the PUSCH resource allocated on at least one first target cell determined by the base station according to the preset priority rule. That is, the determination of the first target cell can be realized by the base station, which solves the problem in the related art that there is no specific solution for the cell in which the terminal sends the request information of beam failure recovery when beam failure occurs in the cell.

According to the above methods for receiving beam failure recovery request at the base station side, optionally, determining at least one first target cell according to a preset priority rule, includes:

determining at least one first target cell according to one priority condition; or determining at least one first target cell according to N priority conditions and priority levels of the priority conditions, where N is a positive integer greater than 1.

The specific implementation of this embodiment may refer to the specific implementation of determining at least one first target cell according to the preset priority rule on the terminal side, but the priority condition on the base station side is slightly different from the priority condition on the terminal side, which is not repeated here.

Optionally, the determining at least one first target cell according to N priority conditions and priority levels of the priority conditions may be achieved by the following steps:

Step 1: determining a number $K_1$ of cells corresponding to a first priority level according to a priority condition corresponding to the first priority level in the N priority conditions;

When $K_1=M$, determining that the first target cell is all cells corresponding to the first priority level;

When $K_1<M$, determining that the first target cell includes all cells corresponding to the first priority level, let $m=2$, $X_m=M-K_1$, and go to step 2;

When $K_1>M$, let $m=2$, $X_m=M$, and perform the steps;

Wherein, the step 2 is:

determining a number Km of cells corresponding to an m-th priority level according to the priority condition corresponding to the m-th priority level in the N priority conditions;

When $K_m=X_m$, determining that the first target cell includes all cells corresponding to the m-th priority level;

When m=N and $K_m>X_m$, determining the first target cell from the cells corresponding to the m-th priority level; when m=N and $K_m<X_m$, determining that the first target cell includes all cells corresponding to the m-th priority level, and then stopping determining the at least one target cell continuously or selecting $X_m-K_m$ cells from cells which are not determined as the at least one first target cells as the first target cell When m<N and $K_m>X_m$, let m=m+1, repeat step 2;

When m<N and $K_m<X_m$, go to step 3;

Wherein, the step 3 is:

Determining that the first target cell includes all cells corresponding to the m-th priority level, let m=m+1, let $X_m=X_m-K_m$, and repeat step 2.

For example: the N priority conditions are 3 priority conditions, and the levels from high to low are: a first priority condition, a second priority condition and a third priority condition; M is 1, then the above method can be specifically implemented as:

According to the first priority condition, it is determined to obtain a first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, there are three cases: as a sub-case: if the number of cells in the second target cell set is 1, the cell is determined to be the first target cell, and the process ends (that is, selection is not implemented according to the priority condition of the third priority level); as another sub-case: if the number of cells in the second target cell set is 0, then the third target cell set is determined from the first target cell according to the third priority condition; as a further sub-case, if the number of cells in the second target cell set is 2, the third target cell set is determined from the second target cell set according to the third priority condition;

In the case of obtaining the third target set, it also includes three cases: as a sub-case: if the number of cells in the third target cell set is 1, the cell is determined as the first target cell; as another sub-case: if the number of cells in the third target cell set is 0, a cell is selected from the first target cell set or the second target cell set (if the second target cell set exists) as the first target cell; as another sub-case, if the number of cells in the third target cell set is 2, one of the two cells is selected as the first target cell (wherein, the specific selection method can be implemented by the terminal, which is not specifically limited here);

As the second case: in the case of obtaining the first target cell set, if the number of cells in the first target cell set is 1, then this cell is determined as the first target cell, and the process ends (that is, selection is not implemented according to the second priority condition and third priority condition);

As the third case: when the first target cell set is obtained, if the number of cells in the first target cell set is 0, the second target cell set is directly determined according to the second priority condition (for example, the second target cell set is determined from the first cell set according to the second priority condition); and how to obtain the first target cell after obtaining the second target cell set can refer to the method in the first case, which will not be repeated here.

For another example: the N priority conditions are 2 priority conditions, and the levels from high to low are: the first priority condition, the second priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, as a sub-case: if the number of cells in the second target cell set is 2 (of course it may be 3), then one of the two cells is selected as the first target cell (wherein, the specific selection method can be implemented by the terminal, which is not specifically limited here); as another sub-case: if the number of cells in the second target cell set is 1, then this cell is determined as the first target cell; as another sub-case: if the number of cells in the second target cell set is 0, a cell is selected from the first target cell set as the first target cell;

As the second case: in the case of obtaining the first target cell set, if the number of cells in the first target cell set is 1, then determining this cell as the first target cell;

As the third case: when the first target cell set is obtained, if the number of cells in the first target cell set is 0, this cell can be directly determined as the first target cell, or the second target cell set is directly determined according to the second priority condition (for example, the second target cell set can be determined from the first cell set according to the second priority condition); and how to obtain the first target cell after obtaining the second target cell set refers to the method in the first case, which will not be repeated here.

Optionally, determining at least one first target cell according to the N priority conditions and the priority levels of the priority conditions can also be achieved by the following steps:

Step 1: determining that a set composed of cells with the highest priority is the i-th target cell set according to the priority condition corresponding to the i=1 priority level in the N priority conditions;

In the case that the number of cells in the i-th target cell set satisfies a first preset condition, determining that at least one cell in the i-th target cell set is the first target cell;

In the case that the number of cells in the i-th target cell set does not meet the first preset condition and does not meet a second preset condition, the following step 2 is performed;

When the number of cells in the i-th target cell set does not meet the first preset condition and meets the second preset condition, determining a set composed by cells with the highest priority is the i-th target cell set according to the priority condition corresponding to the (i+1)th priority level in the N priority conditions, and repeating the above steps of determining the i-th target cell set;

Step 2: determining at least one cell from the i-th target cell set as the (i+1)th target cell set according to the priority condition corresponding to the (i+1)th priority level in the N priority conditions; wherein, i is a positive integer, i is less than N;

When i+1 is less than N, and in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set as the first target cell; when the number of cells in the (i+1)th target cell set does not meet the first preset condition and the second preset condition, making i=i+1 and repeating the step 2;

In the case that i+1 is equal to N, in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least cell in the (i+1)th target cell set and the i-th target cell set is determined as the first target cell.

The specific implementation of this embodiment may refer to the specific implementation of determining at least one first target cell according to a preset priority rule on the terminal side, but the priority conditions on the base station side are slightly different from those on the terminal side.

For example: the N priority conditions are 3 priority conditions, and the levels from high to low are: the first priority condition, the second priority condition and the third priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, there are three cases: as a sub-case: if the number of cells in the second target cell set is 1, the cell is determined to be the first target cell, and the process ends (that is, selection is not implemented according to the priority condition of the third priority level); as another sub-case: if the number of cells in the second target cell set is 0, then a cell is selected from the first target cell set as the first target cell; as another sub-case, if the number of cells in the second target cell set is 2, the third target cell set is determined from the second target cell set according to the third priority condition;

In the case of obtaining the third target set, it also includes three cases: as a sub-case: if the number of cells in the third target cell set is 1, the cell is determined as the first target cell; as another sub-case: if the number of cells in the third target cell set is 0, a cell is selected from the first target cell set as the first target cell; as another sub-case, if the number of cells in the second target cell set is 2, then one of the two cells is selected as the first target cell (wherein, the specific selection method can be implemented by the terminal, which is not specifically limited here);

As the second case: in the case of obtaining the first target cell set, if the number of cells in the first target cell set is 1, then this cell is determined as the first target cell, and the process ends (that is, selection is not implemented according to the second priority condition and third priority condition);

As the third case: when the first target cell set is obtained, if the number of cells in the first target cell set is 0, a cell can be directly determined from the cells to be selected (such as the first cell set) as the first target cell, or the second target cell set is directly determined according to the second priority condition (for example, the second target cell set may be determined from the first cell set according to the second priority condition); and then how to obtain the first target cell after obtaining the second target cell set refers to the first case, which will not be repeated here.

For another example: the N priority conditions are 2 priority conditions, and the levels from high to low are: the first priority condition, the second priority condition; M is 1, then the above method can be specifically implemented as:

According to the first priority condition, determining to obtain the first target cell set (for example, the first target cell set may be determined from the first cell set according to the first priority condition);

As the first case: when the first target cell set is obtained, if the number of cells in the first target cell set is 3, then the second target cell is determined from the first target cell set according to the second priority condition;

In the case of obtaining the second target cell set, as a sub-case: if the number of cells in the second target cell set is 2 (of course it may be 3), then one of the two cells is selected as the first target cell (wherein, the specific selection method can be implemented by the terminal, which is not specifically limited here); as another sub-case: if the number of cells in the second target cell set is 1, then this cell is determined as the first target cell; as another sub-case: if the number of cells in the second target cell set is 0, a cell is selected from the first target cell set as the first target cell;

As the second case: in the case of obtaining the first target cell set, if the number of cells in the first target cell set is 1, then determining this cell as the first target cell;

As the third case: when the first target cell set is obtained, if the number of cells in the first target cell set is 0, this cell can be directly determined as the first target cell, or the second target cell set is directly determined according to the second priority condition (for example, the second target cell set can be determined from the first cell set according to the second priority condition); and how to obtain the first target cell after obtaining the second target cell set refers to the method in the first case, which will not be repeated here.

The above method is described in detail below in conjunction with specific examples:

Example 1: The priority condition of the first priority level is: the priority of the cell where the beam failure event is not detected is higher than the priority of the cell where the beam failure event is detected;

The priority condition of the second priority level is: the priority of the primary cell is higher than the priority of the secondary cell;

Wherein, the first priority level is higher than the second priority level;

Scenario 1: The candidate cells include a PCell and an SCell, and neither the PCell nor an SCell detects a beam failure event;

According to the priority condition of the first priority level, the determined at least one cell includes: a PCell and one SCell, then it is determined that the cell set formed by the PCell and the SCell is the first target cell set;

If the number of required cells is 2, that is, the number of cells in the first target cell set satisfies the first preset condition, then determining that the PCell and the SCell are the first target cells;

If the number of required cells is 1, that is, the number of cells in the first target cell set does not meet the first preset condition, determining one cell from the first target cell set according to the priority condition of the second priority level, the one cell is PCell; then the PCell is determined to be the first target cell.

Scenario 2: The candidate cells include a PCell and one SCell, and the PCell detects a beam failure event, but the SCell does not detect a beam failure event;

According to the priority condition of the first priority level, the determined at least one cell includes: the SCell, then it is determined that the cell set composed by the SCell is the first target cell set;

If the number of required cells is 1, that is, the number of cells in the first target cell set satisfies the first preset condition, the SCell is determined to be the first target cell.

If the number of required cells is 2, one cell can be determined from all candidate cells according to the priority condition of the second priority level, and the cell can be used together with the SCell as the first target cell.

Scenario 3: The candidate cells include a PCell and one SCell, and the PCell has detected a beam failure event;

According to the priority condition of the first priority level, the determined number of cells is 0; then the cell set composed of the PCell and the one SCell can be used as the first target cell set;

According to the priority condition of the first priority level, at least one cell determined from the first target cell set is the PCell;

If the number of required cells is 1, the PCell is determined to be the first target cell.

Example 2: The priority condition of the first priority level is: the priority of the cells in the first frequency band is higher than that of the cells in the second frequency band;

The priority condition of the second priority level is: the priority of the cell where the beam failure event is not detected is higher than the priority of the cell where the beam failure event is detected;

The priority condition of the third priority level is: the priority of a cell with a lower cell sequence number is higher than that of a cell with a higher cell sequence number;

Scenario 1: The candidate cells are: Cell 1, Cell 2, Cell 3, and Cell 4, where the frequency bands of Cell 1 and Cell 3 are Frequency Range 1 (FR 1 in the 5G NR system), the frequency band of Cell 2 and Cell 4 are Frequency Range 2 (FR 2 in the 5G NR system); no beam failure event was detected in cell 1, cell 2, and cell 4, and a beam failure event was detected in cell 3; the required number of cells is 1;

According to the priority condition of the first priority level, the determined at least one cell is: cell 1 and cell 3; then the set formed by cell 1 and cell 3 is taken as the first target cell set;

According to the priority condition of the second priority level, at least one cell determined from the first target cell set is: cell 1, and cell 1 is taken as the first target cell.

Scenario 2: The candidate cells are: Cell 1, Cell 2, Cell 3, and Cell 4. The frequency bands of Cell 1 and Cell 3 are Frequency Range 1 (FR 1), and the frequency bands of Cell 2 and Cell 4 are Frequency Range 2 (FR 2); no beam failure event was detected in cell 1, cell 2, and cell 4, and a beam failure event was detected in cell 3; the required number of cells is 2;

According to the priority condition of the first priority level, the determined at least one cell is: cell 1 and cell 3; then the set formed by cell 1 and cell 3 is taken as the first target cell set;

According to the priority condition of the second priority level, at least one cell determined from the first target cell set is: cell 1, then according to the cell 1 and the first target cell set, the second target cell set is determined as: Cell 1, Cell 3;

According to the priority condition of the third priority level, two cells are selected from the second target cell set, namely, cell 1 and cell 3.

Optionally, although several examples of priority conditions are given above, it should be understood that the above examples are used to illustrate the method for determining the first target cell, that is, in addition to the above setting of the priority conditions and the priority levels, the priority condition can also be set: the priority of the primary cell is higher than that of the secondary cell, and there is always the highest priority level, that is, when the PUSCH resource is allocated on the PCell, the UE always sends BFR information on the PCell, the embodiments of the present disclosure are not limited thereto.

Optionally, the priority condition includes at least one of the following:

a priority of a cell where the terminal has not reported the beam failure event is higher than a priority of a cell where the terminal has reported the beam failure event;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency.

Optionally, the above priority conditions are used in combination, that is, when a plurality of priority conditions are used to determine at least one target cell, the plurality priority conditions may not include: the priority of the primary cell is higher than a priority of a main secondary cell, the priority of the main secondary cell is higher than that of the secondary cell; and the priority of the primary cell is the same as the priority of the main secondary cell, and the priority of the main secondary cell is higher than that of the secondary cell; Alternatively, the plurality of priority conditions may include: the priority of the primary cell is higher than a priority of a main secondary cell, the priority of the main secondary cell is higher than that of the secondary cell; or the plurality of priority conditions may include the priority of the primary cell is the same as the priority of the main secondary cell, and the priority of the main secondary cell is higher than that of the secondary cell.

In particular, when at least one first target cell is determined using the priority condition that a priority of a cell where the terminal has not reported the beam failure event is higher than a priority of a cell where the terminal has reported the beam failure event, it can prevent UE from sending the beam failure recovery request on a cell for which the beam failure occurs, so as to avoid the problem that the beam failure recovery request may not be received by the base station due to the beam failure recovery request sent on the cell for which the beam failure occurs, which is beneficial to improve the transmission reliability of the beam failure recovery request.

According to the above method of receiving the beam failure recovery request on the base station side, the request information of the beam failure recovery includes: at least one of indication information of a identifier of a cell where the beam failure occurs and indication information of a beam that meets the quality condition corresponding to the identifier of the cell where the beam failure occurs.

Figure 6:
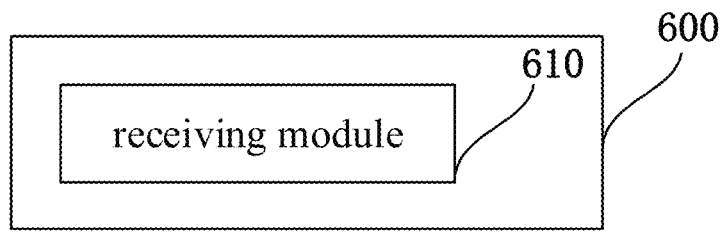
FIG. 6 shows a block diagram of the base station according to the embodiment of the present disclosure.

As shown in FIG. 6, an embodiment of the present disclosure provides a base station 600, including:

a receiving module 610, configured to receive request information of beam failure recovery sent by a terminal on the first target cell;

The first target cell is: at least one cell determined by the base station according to a preset priority rule, or at least one cell determined by the terminal according to the preset priority rule.

Optionally, the first target cell is: at least one cell determined by the base station from the first cell set according to the preset priority rule, or at least one cell determined by the terminal from the first cell set according to the preset priority rule.

Wherein, the first cell set is a full set or a subset of a set composed of all cells in which the base station has allocated a physical uplink shared channel PUSCH resource to the terminal; or, The first cell set is a full set or a subset of a set composed of all cells in which the base station configures PUSCH transmission with a configured grant to the terminal.

Optionally, the base station 600 further includes:

a first determining module, configured to determine at least one first target cell according to one priority condition;

a second determining module, configured to determine at least one first target cell according to N priority conditions and priority levels of the priority conditions, where N is a positive integer greater than 1.

Optionally, the second determining module includes:

a first determination sub-module, configured to determine that a set composed of cells with the highest priority is the i-th target cell set according to the priority condition corresponding to the i=1 priority level in the N priority conditions;

In the case that the number of cells in the i-th target cell set satisfies a first preset condition, determining that at least one cell in the i-th target cell set is the first target cell;

In the case that the number of cells in the i-th target cell set does not meet the first preset condition and does not meet a second preset condition, the following step of the second determination sub-module is performed;

The second determination sub-module is configured to determine at least one cell from the i-th target cell set as the (i+1)th target cell set according to the priority condition corresponding to the (i+1)th priority level in the N priority conditions; wherein, i is a positive integer, i is less than N;

When i+1 is less than N, and in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set as the first target cell; when the number of cells in the (i+1)th target cell set does not meet the first preset condition and the second preset condition, making i=i+1 and repeating the step of the second determination sub-module;

In the case that i+1 is equal to N, in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set is determined as the first target cell.

Optionally, the priority condition includes at least one of the following:

a priority of a cell where the terminal has not reported the beam failure event is higher than a priority of a cell where the terminal has reported the beam failure event;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency.

Optionally, the request information of beam failure recovery includes: at least one of indication information of an identifier of a cell where the beam failure occurs and indication information of a beam that meets the quality condition corresponding to the identifier of the cell where the beam failure occurs.

The base station embodiments of the present disclosure correspond to the foregoing method embodiments, and all implementation in the foregoing method embodiments are applicable to the embodiments of the network device, and the same technical effects can also be achieved.

The base station 600 in the above solution can receive the request information of beam failure recovery through at least one first target cell determined by the base station or the terminal according to the preset priority rule, so as to solve the problem in the related art that when the beam failure occurs in the cell, in which cell the terminal sends the request information of beam failure recovery.

Figure 7:
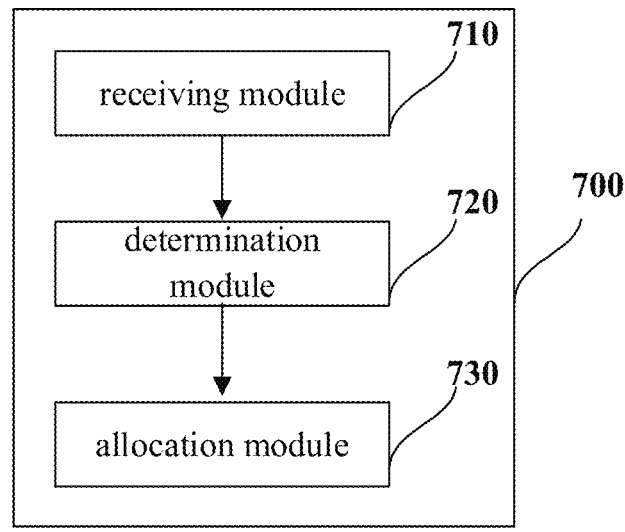
FIG. 7 shows another block diagram of the base station according to the embodiment of the present disclosure.

As shown in FIG. 7, an embodiment of the present disclosure provides a base station 700, including:

a receiving module 710, configured to receive report information of beam failure event sent by a terminal;

a determination module 720, configured to determine at least one first target cell according to a preset priority rule;

an allocation module 730, configured to allocate PUSCH resource to the terminal on the first target cell, and the PUSCH resource can be used for the terminal to transmit the request information of the beam failure recovery.

Optionally, the determining module 720 includes:

a first determination sub-module, configured to determine at least one first target cell according to one priority condition;

a second determination sub-module, configured to determine at least one first target cell according to N priority conditions and priority levels of the priority conditions, where N is a positive integer greater than 1.

Optionally, the second determination sub-module is specifically used for:

Step 1: determining a number $K_1$ of cells corresponding to a first priority level according to a priority condition corresponding to the first priority level in the N priority conditions;

When $K_1=M$, determining that the first target cell is all cells corresponding to the first priority level;

When $K_1<M$, determining that the first target cell includes all cells corresponding to the first priority level, let m=2, $X_m=M-K_1$, and go to step 2;

When $K_1>M$, let m=2, $X_m=M$, and perform the steps;

Wherein, the step 2 is:

determining a number $K_m$ of cells corresponding to an m-th priority level according to the priority condition corresponding to the m-th priority level in the N priority conditions;

When $K_m=X_m$, determining that the first target cell includes all cells corresponding to the m-th priority level;

When m=N and $K_m>X_m$, determining the first target cell from the cells corresponding to the m-th priority level; when m=N and $K_m<X_m$, determining that the first target cell includes all cells corresponding to the m-th priority level, and then stopping determining the at least one target cell continuously or selecting $X_m-K_m$ cells from cells which are not determined as the at least one first target cells as the first target cell When m<N and $K_m>X_m$, let m=m+1, repeat step 2;

When m<N and $K_m<X_m$, go to step 3;

Wherein, the step 3 is:

Determining that the first target cell includes all cells corresponding to the m-th priority level, let m=m+1, let $X_m=X_m-K_m$, and repeat step 2.

Optionally, the priority condition includes at least one of the following:
- a priority of a cell where the terminal has not reported the beam failure event is higher than a priority of a cell where the terminal has reported the beam failure event;
- a priority of a primary cell being higher than a priority of a secondary cell;
- a priority of a cell with a lower cell index being higher than a priority of a cell with a higher cell index;
- a priority of a cell in a first frequency band being higher than a priority of a cell in a second frequency band;
- a priority of a cell with a lower carrier frequency being higher than a priority of a cell with a higher carrier frequency.

Optionally, the request information of the beam failure recovery includes: at least one of indication information of an identifier of a cell where the beam failure occurs and indication information of a beam that meets the quality condition corresponding to the identifier of the cell where the beam failure occurs.

The base station embodiments of the present disclosure correspond to the foregoing method embodiments, and all implementation in the foregoing method embodiments are applicable to the embodiments of the network device, and the same technical effects can also be achieved.

The base station 700 in the above solution receives the report information of the beam failure event sent by the terminal; determines at least one first target cell according to the preset priority rule; allocates PUSCH resource for the terminal in the first target cell, the PUSCH resource may be used for the terminal to transmit the request information of the beam failure recovery. In this way, the terminal can send the request information of beam failure recovery on the PUSCH resource allocated on at least one first target cell determined by the base station according to the preset priority rule, which solves the problem in the related art that when the beam failure occurs in the cell, there is no specific solution in which cell the request information of beam failure recovery is sent by the terminal.

Figure 8:
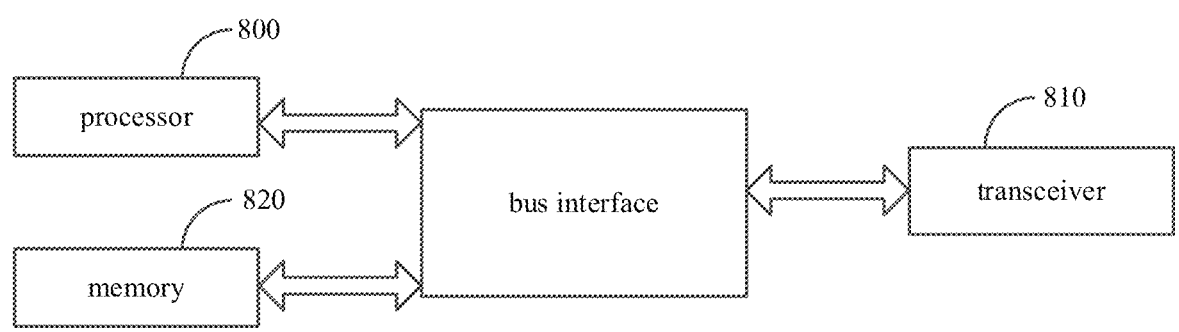
FIG. 8 is a structural block diagram of a base station according to an embodiment of the present disclosure.

In order to better achieve the above purpose, as shown in FIG. 8, an embodiment of the present disclosure further provides a base station, the base station includes: a processor 800; a memory 820 connected to the processor 800 through a bus interface, and a transceiver 810 connected to the processor 800 through a bus interface; the memory 820 is used for storing programs and data used by the processor when performing operations; data information or pilot frequencies are sent through the transceiver 810, and the uplink control channel is received through the transceiver 810; when the processor 800 calls and executes the programs and data stored in the memory 820, the following functions are implemented.

The processor 800 is configured to read the program in the memory 820, and perform the following processes:
- receiving request information of beam failure recovery sent by a terminal on the first target cell;
- The first target cell is: at least one cell determined by the base station according to a preset priority rule, or at least one cell determined by the terminal according to the preset priority rule.

Optionally, the first target cell is: at least one cell determined by the base station from the first cell set according to the preset priority rule, or at least one cell determined by the terminal from the first cell set according to the preset priority rule.

Wherein, the first cell set is a full set or a subset of a set composed of all cells in which the base station has allocated a physical uplink shared channel PUSCH resource to the terminal; or, The first cell set is a full set or a subset of a set composed of all cells in which the base station configures PUSCH transmission with a configured grant to the terminal.

Optionally, the processor 800 further implements the following steps when executing the computer program:
- determining at least one first target cell according to one priority condition; or
- determining at least one first target cell according to N priority conditions and priority levels of the priority conditions, where N is a positive integer greater than 1.

Optionally, the processor 800 further implements the following steps when executing the computer program:
- Step 1: determining a number $K_1$ of cells corresponding to a first priority level according to a priority condition corresponding to the first priority level in the N priority conditions;
- When $K_1=M$, determining that the first target cell is all cells corresponding to the first priority level;
- When $K_1<M$, determining that the first target cell includes all cells corresponding to the first priority level, let $m=2$, $X_m=M-K_1$, and go to step 2;
- When $K_1>M$, let $m=2$, $X_m=M$, and perform the steps;
- Wherein, the step 2 is:
- determining a number $K_m$ of cells corresponding to an m-th priority level according to the priority condition corresponding to the m-th priority level in the N priority conditions;
- When $K_m=X_m$, determining that the first target cell includes all cells corresponding to the m-th priority level;
- When m=N and $K_m>X_m$, determining the first target cell from the cells corresponding to the m-th priority level; when m=N and $K_m<X_m$, determining that the first target cell includes all cells corresponding to the m-th priority level, and then stopping determining the at least one target cell continuously or selecting $X_m-K_m$ cells from cells which are not determined as the at least one first target cells as the first target cell
- When m<N and $K_m>X_m$, let m=m+1, repeat step 2;
- When m<N and $K_m<X_m$, go to step 3;
- Wherein, the step 3 is:
- Determining that the first target cell includes all cells corresponding to the m-th priority level, let m=m+1, let $X_m=X_m-K_m$, and repeat step 2.

Optionally, the priority condition includes at least one of the following:
- a priority of a cell where the terminal has not reported the beam failure event is higher than a priority of a cell where the terminal has reported the beam failure event;
- a priority of a primary cell being higher than a priority of a secondary cell;
- a priority of a cell with a lower cell index being higher than a priority of a cell with a higher cell index;
- a priority of a cell in a first frequency band being higher than a priority of a cell in a second frequency band;
- a priority of a cell with a lower carrier frequency being higher than a priority of a cell with a higher carrier frequency.

Optionally, the request information of the beam failure recovery includes: at least one of indication information of an identifier of a cell where the beam failure occurs and indication information of a beam that meets the quality condition corresponding to the identifier of the cell where the beam failure occurs.

As another implementation of the base station, the processor 800 further implements the following steps when executing the computer program:

Receiving report information of beam failure event sent by a terminal;

Determining at least one first target cell according to a preset priority rule;

Allocating PUSCH resource to the terminal on the first target cell, and the PUSCH resource can be used for the terminal to transmit the request information of the beam failure recovery.

Optionally, the processor 800 further implements the following steps when executing the computer program:

determining at least one first target cell according to one priority condition; or determining at least one first target cell according to N priority conditions and priority levels of the priority conditions, where N is a positive integer greater than 1.

Optionally, the processor 800 further implements the following steps when executing the computer program:

Step 1: determining that a set composed of cells with the highest priority is the i-th target cell set according to the priority condition corresponding to the i=1 priority level in the N priority conditions;

In the case that the number of cells in the i-th target cell set satisfies a first preset condition, determining that at least one cell in the i-th target cell set is the first target cell;

In the case that the number of cells in the i-th target cell set does not meet the first preset condition and does not meet a second preset condition, the following step 2 is performed;

When the number of cells in the i-th target cell set does not meet the first preset condition and meets the second preset condition, determining a set composed by cells with the highest priority is the i-th target cell set according to the priority condition corresponding to the (i+1)th priority level in the N priority conditions, and repeating the above steps of determining the i-th target cell set;

Step 2: determining at least one cell from the i-th target cell set as the (i+1)th target cell set according to the priority condition corresponding to the (i+1)th priority level in the N priority conditions; wherein, i is a positive integer, i is less than N;

When i+1 is less than N, and in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set as the first target cell; when the number of cells in the (i+1)th target cell set does not meet the first preset condition and the second preset condition, making i=i+1 and repeating the step 2;

In the case that i+1 is equal to N, in the case that the number of cells in the (i+1)th target cell set satisfies the first preset condition, at least one cell in the (i+1)th target cell set is determined as the first target cell; when the number of cells in the (i+1)th target cell set satisfies the second preset condition, at least one cell in the (i+1)th target cell set and the i-th target cell set is determined as the first target cell.

Optionally, the priority condition includes at least one of the following:

a priority of a cell where the terminal has not reported the beam failure event is higher than a priority of a cell where the terminal has reported the beam failure event;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency.

Optionally, the request information of beam failure recovery includes: at least one of indication information of an identifier of a cell where the beam failure occurs and indication information of a beam that meets the quality condition corresponding to the identifier of the cell where the beam failure occurs.

The transceiver 810 is used to receive and transmit data under the control of the processor 800.

In FIG. 8, the bus architecture may include any number of interconnected buses and bridges, specifically various circuits of one or more processors represented by processor 800 and memory represented by memory 820 are linked together. The bus architecture may also link various other circuits together, such as peripherals, voltage regulators, and power management circuits, which are well known in the art and, therefore, will not be described further herein. The bus interface provides the interface. Transceiver 810 may be a number of elements, including a transmitter and a receiver, units for communicating with various other devices over a transmission medium. The processor 800 is responsible for managing the bus architecture and general processing, and the memory 820 may store data used by the processor 800 in performing operations.

Those skilled in the art can understand that all or part of the steps of implementing the above embodiments can be completed by hardware, or can be completed by instructing relevant hardware through a computer program, where the computer program includes instructions for executing part or all of the steps of the above method; and the computer program can be stored in a readable storage medium, and the storage medium can be any form of storage medium.

Embodiments of the present disclosure further provide a computer-readable storage medium, where a computer program is stored on the computer-readable storage medium. When the computer program is executed by a processor, the method for receiving a beam failure recovery request described in at least one of the foregoing embodiments is implemented. In order to avoid repetition, the details are not repeated here. The computer-readable storage medium is, for example, a read-only memory (ROM), a random access memory (RAM), a magnetic disk, or an optical disk.

The interaction process between the above-mentioned terminal and base station is described in detail below with reference to specific examples:

Example 1:

The terminal (UE) monitors the beam failure event. When the UE has monitored the beam failure event, it sends a beam failure recovery event report to the base station (e.g. gNB) through the BFR-specific SR-like PUCCH.

The base station receives the beam failure event report sent by the terminal, and allocates PUSCH resource to the terminal according to the PUCCH.

The terminal determines the priority of the cell to which the PUSCH resource is allocated according to the first priority rule, and transmits a sequence number of a cell in which the beam failure event occurs on the cell with the highest priority.

Among them, the first priority rule is: Cells in FR 1 (such as frequency bands less than 6 GHz) have higher priority than Cells in FR 2 (such as frequency bands greater than 6 GHz); when all cells are in the same frequency band, a priority of a cell with a lower index is higher than that of a cell with a higher index.

For example, a cell group includes SCell 1, SCell 2, SCell 3 and SCell 4, wherein SCell 1 and SCell 3 are cells in FR1, and SCell 2 and SCell 4 are cells in FR2. When the UE determines that a beam failure event has occurred in SCell 1 and SCell 2, the UE sends a beam failure event report to the base station. The base station allocates the PUSCH resource corresponding to the PUCCH carrying the beam failure event report to the terminal.

If the base station allocates the PUSCH resource on SCell 4, there are available PUSCH transmission with a configured grant on SCell 3. Then, according to the first priority rule, the UE determines that the priority of SCell 3 is higher than that of SCell 4, and reports the BFR information (such as cell index) of SCell 1 and SCell 2 on SCell 3.

The first priority rule is: the cell where the PUSCH resource allocated by the base station according to the SR-like PUCCH specially configured for BFR transmitted by the terminal has a higher priority than other cells to which PUSCH resource is allocated. In the case of the PUSCH resource allocated by the base station according to the SR-like PUCCH specially configured for BFR transmitted by the terminal, the priority of the cell with the lower cell index is higher than the priority of the cell with the higher cell index.

For example, a cell group includes SCell 1, SCell 2, SCell 3 and SCell 4, wherein SCell 1 and SCell 3 are cells in FR 1, and SCell 2 and SCell 4 are cells in FR 2. When the UE determines that a beam failure event has occurred in SCell 1 and SCell 2, the UE sends a beam failure event report to the base station. The base station allocates the PUSCH resource corresponding to the PUCCH carrying the beam failure event report to the terminal.

If the base station allocates the PUSCH resource to SCell 3 and SCell 4. Then, according to the first priority rule, the UE determines that the priority of SCell 3 with a smaller cell index is higher than that of SCell 4, and reports the BFR information (such as cell index) of SCell 1 and SCell 2 on SCell 3.

Example 2:

The UE monitors the beam failure event. When the UE has monitored the beam failure event, it sends a beam failure recovery event report to the base station (e.g. gNB) through a Physical Random Access Channel (PRACH) signal.

The terminal determines the priority of the cells in the first cell set according to the first priority rule, and transmits an index of a cell in which the beam failure event occurs on the cell with the highest priority.

Optionally, the first cell set is a set composed of all cells configured with the configuration granted PUSCH.

Wherein, the first priority rule is: a cell that has not detected a beam failure event has a higher priority than a cell that has detected a beam failure event.

For example, a cell group includes SCell 1, SCell 2, SCell 3 and SCell 4, wherein SCell 1, SCell 3 and SCell 4 are all configured with available configuration granted PUSCH. When the UE determines that a beam failure event has occurred in SCell 1 and SCell 2, the UE sends a beam failure event report to the base station. Then, according to the first priority rule, the UE determines that the priority of SCell 3 and SCell 4 is higher than that of SCell 1, and then selects one from SCell 3 and SCell 4 to report the BFR information of SCell 1 and SCell 2 (such as the cell index).

In addition, it should be pointed out that, in the device and method of the present disclosure, obviously, each component or each step can be decomposed and/or recombined. These decomposition and/or recombination should be considered equivalents of the present disclosure. Also, the steps of performing the above-mentioned method can naturally be performed in chronological order, but need not necessarily be performed in chronological order, and some steps can be performed in parallel or independently of each other. Those of ordinary skill in the art can understand that all or any steps or components of the method and device of the present disclosure can be implemented in any computing device (including a processor, storage medium, etc.) or a network of computing devices, in hardware, firmware, software, or a combination thereof, which can be implemented by those of ordinary skill in the art using their basic programming skills after reading the description of the present disclosure.

Accordingly, the objects of the present disclosure can also be achieved by running a program or a set of programs on any computing device. The computing device may be a known general purpose device. Therefore, the objects of the present disclosure can also be achieved merely by providing a program product containing program code for implementing the method. That is, such a program product also constitutes the present disclosure, and a storage medium in which such a program product is stored also constitutes the present disclosure. Obviously, the storage medium can be any known storage medium or any storage medium developed in the future. It should also be pointed out that, in the device and method of the present disclosure, obviously, each component or each step can be decomposed and/or recombined. These decomposition and/or recombination should be considered equivalents of the present disclosure. Also, the steps of executing the above-described method can naturally be executed in chronological order, but need not necessarily be executed in chronological order. Certain steps may be performed in parallel or independently of each other.

It should be noted that it should be understood that the division of the above modules is only a division of logical functions, and in actual implementation, all or part of them may be integrated into a physical entity, or may be physically separated. And these modules can all be implemented in the form of software calling through processing elements; they can also all be implemented in hardware; some modules can also be implemented in the form of calling software through processing elements, and some modules can be implemented in hardware. For example, the determination module may be a separately established processing element, or may be integrated into a certain chip of the above-mentioned device to be implemented, in addition, it may also be stored in the memory of the above-mentioned device in the form of program code, and a certain processing element of the above-mentioned device may call and execute the function of the above determined module. The implementation of other modules is similar. In addition, all or part of these modules can be integrated together, and can also be implemented independently. The processing element described here may be an integrated circuit with signal processing capability. In the implementation process, each step of the above-mentioned method or each of the above-mentioned modules can be completed by an integrated logic circuit of hardware in the processor element or an instruction in the form of software.

For example, each module, unit, sub-unit or sub-module may be one or more integrated circuits configured to implement the above method, such as: one or more Application Specific Integrated Circuits (ASIC), or, one or more microprocessors (digital signal processors, DSP), or, one or more field programmable gate arrays (FPGA), etc. For another example, when one of the above modules is implemented in the form of program code executed by a processing element, the processing element may be a general-purpose processor, such as a central processing unit (CPU) or other processors that can call program codes. For another example, these modules can be integrated together and implemented in the form of a system-on-a-chip (SOC).

The terms "first", "second", etc. in the description and claims of the present disclosure are used to distinguish similar objects, and are not necessarily used to describe a specific order. It is to be understood that the used data can be interchanged under appropriate circumstances, so that the embodiments of the disclosure described herein are implemented in sequences other than those illustrated or described herein. Furthermore, the terms "comprising" and "having" and any variations thereof, are intended to cover non-exclusive inclusion, for example, a process, method, system, product or device comprising a series of steps or units is not necessarily limited to those expressly listed, those steps or units may include other steps or units not expressly listed or inherent to these processes, methods, products or devices. In addition, the use of "and/or" in the description and the claims means at least one of the linked objects, such as A and/or B and/or C, is meant to include seven conditions including A alone, B alone, C alone, both A and B, both B and C, both A and C, and A, B, and C. Similarly, the use of "at least one of A and B" in the description and claims should be understood to mean "A alone, B alone, or both A and B."

The above are the optional embodiments of the present disclosure. It should be pointed out that for those skilled in the art, several improvements and modifications can be made without departing from the principles described in the present disclosure. It should be regarded as the protection scope of the present disclosure.

What is claimed is:

1. A method for transmitting a beam failure recovery request, applied to a terminal, comprising:
    determining at least one first target cell according to a preset priority rule when a beam failure event is detected;
    sending request information of beam failure recovery on the at least one first target cell;
    wherein the determining at least one first target cell according to a preset priority rule comprises:
    determining the at least one first target cell from a first cell set according to the preset priority rule;
    wherein, the first cell set is a full set or a subset of a set composed of all cells in which a base station has allocated a physical uplink shared channel (PUSCH) resource to the terminal; or,
    the first cell set is a full set or a subset of a set composed of all cells in which the base station configures PUSCH transmission with a configured grant to the terminal;
    wherein the sending the request information of the beam failure recovery on the at least one first target cell comprises:
    sending, on the at least one first target cell, the request information of beam failure recovery for a plurality of cells or all cells in which the beam failure occurs;
    wherein the sending, on the at least one first target cell, the request information of beam failure recovery for a plurality of cells or all cells in which the beam failure occurs includes:
    in the case that an available PUSCH resource allocated by the base station for the at least one first target cell are less than a resource required for sending the request information of the beam failure recovery, determining at least one second target cell other than the at least one first target cell according to the preset priority rule;
    sending the request information of the beam failure recovery on the at least one first target cell and the at least one second target cell.

2. The method according to claim 1, wherein all cells in the first cell set are included in a cell group, the beam failure event occurs for each cell in the cell group.

3. The method according to claim 1, wherein the determining at least one first target cell according to a preset priority rule comprises:
    determining the at least one first target cell according to one priority condition; or
    determining the at least one first target cell according to N priority conditions and priority levels of the N priority conditions, wherein N is a positive integer greater than 1.

4. The method according to claim 3, wherein the priority condition includes at least one of the following:
    a priority of a cell for which beam failure detection is not implemented being higher than a priority of a cell for which the beam failure detection has been implemented;
    a priority of a cell where the beam failure event is not detected being higher than a priority of a cell where the beam failure event has been detected;
    a priority of a primary cell being higher than a priority of a secondary cell;
    a priority of a cell with a lower cell index being higher than a priority of a cell with a higher cell index;
    a priority of a cell in a first frequency band being higher than a priority of a cell in a second frequency band;
    a priority of a cell with a lower carrier frequency being higher than a priority of a cell with a higher carrier frequency;
    a priority of a first cell being higher than priorities of cells other than the first cell in a first target cell set; wherein, the first cell is a cell where the PUSCH resource is located, the PUSCH resource is allocated by the base station according to PUCCH configured for BFR transmitted by the terminal; the first target cell set is a set composed of all cells to which the base station has allocated PUSCH resource, or the target cell set is a set composed of at least one cell determined according to a priority condition with a higher priority; or
    a priority of a second cell being higher than priorities of cells other than the second cell in the second target cell set; wherein, the second cell is a cell where the PUSCH resource is located, the PUSCH resource is allocated by the base station after receiving a beam failure event report sent by the terminal; the second target cell set is a set composed of all cells to which the base station has allocated the PUSCH resource, or the second target cell set is a set composed of at least one cell determined according to a priority condition with a higher priority.

5. The method according to claim 1, wherein the request information of the beam failure recovery includes: at least one item of indication information of an identifier of a cell in which the beam failure occurs and indication information of a new beam corresponding to a cell in which the beam failure occurs for at least part of beams.

6. A terminal, comprising: a transceiver, a memory, a processor and a computer program stored in the memory and executed by the processor, the processor implements the steps of the method according to claim 1.

7. A method for receiving a beam failure recovery request, applied to a base station, comprising:
  receiving request information of beam failure recovery sent by a terminal on at least one first target cell,
  wherein the at least one first target cell is at least one cell determined by the base station according to a preset priority rule, or at least one cell determined by the terminal according to the preset priority rule;
  wherein the at least one first target cell is at least one cell determined by the base station from a first cell set according to the preset priority rule, or at least one cell determined by the terminal from the first cell set according to the preset priority rule,
  wherein, the first cell set is a full set or a subset of a set composed of all cells in which the base station has allocated a physical uplink shared channel (PUSCH) resource to the terminal; or,
  the first cell set is a full set or a subset of a set composed of all cells in which the base station configures PUSCH transmission with a configured grant to the terminal;
  wherein the receiving request information of beam failure recovery sent by a terminal on at least one first target cell comprises:
  receiving, on the at least one first target cell, the request information of beam failure recovery for a plurality of cells or all cells in which the beam failure occurs;
  wherein the receiving, on the at least one first target cell, the request information of beam failure recovery for a plurality of cells or all cells in which the beam failure occurs comprises:
  in the case that an available PUSCH resource allocated by the base station for the at least one first target cell are less than a resource required for sending the request information of the beam failure recovery, determining at least one second target cell other than the at least one first target cell according to the preset priority rule;
  receiving the request information of the beam failure recovery on the at least one first target cell and the at least one second target cell.

8. The method according to claim 7, wherein the determining at least one first target cell according to a preset priority rule includes:
  determining the at least one first target cell according to one priority condition; or
  determining the at least one first target cell according to N priority conditions and priority levels of the N priority conditions, wherein N is a positive integer greater than 1.

9. The method according to claim 8, wherein the priority condition includes at least one of the following:
  a priority of a cell where the terminal has not reported the beam failure event is higher than a priority of a cell where the terminal has reported the beam failure event;
  a priority of a primary cell being higher than a priority of a secondary cell;
  a priority of a cell with a lower cell index being higher than a priority of a cell with a higher cell index;
  a priority of a cell in a first frequency band being higher than a priority of a cell in a second frequency band;
  a priority of a cell with a lower carrier frequency being higher than a priority of a cell with a higher carrier frequency.

10. The method according to claim 7, wherein the request information of the beam failure recovery includes: at least one item of indication information of an identifier of a cell in which the beam failure occurs and indication information of a new beam corresponding to a cell in which the beam failure occurs for at least part of beams.

11. A base station, comprising: a transceiver, a memory, a processor, and a computer program stored in the memory and executed by the processor, wherein the processor implements the steps of the method for receiving a beam failure recovery request according to claim 7.

12. A method for receiving a beam failure recovery request, applied to a base station, comprising:
  receiving report information of beam failure event sent by a terminal;
  determining at least one first target cell according to a preset priority rule;
  allocating a PUSCH resource to the terminal on the at least one first target cell, the PUSCH resource being used for the terminal to transmit request information of beam failure recovery;
  wherein the determining at least one first target cell according to a preset priority rule comprises:
  determining the at least one first target cell from a first cell set according to the preset priority rule;
  wherein, the first cell set is a full set or a subset of a set composed of all cells in which a base station has allocated a physical uplink shared channel (PUSCH) resource to the terminal; or,
  the first cell set is a full set or a subset of a set composed of all cells in which the base station configures PUSCH transmission with a configured grant to the terminal;
  wherein the method further comprises:
  receiving, on the at least one first target cell, the request information of beam failure recovery for a plurality of cells or all cells in which the beam failure occurs;
  wherein the receiving, on the at least one first target cell, the request information of beam failure recovery for a plurality of cells or all cells in which the beam failure occurs comprises:
  in the case that an available PUSCH resource allocated by the base station for the at least one first target cell are less than a resource required for sending the request information of the beam failure recovery, determining at least one second target cell other than the at least one first target cell according to the preset priority rule;
  receiving the request information of the beam failure recovery on the at least one first target cell and the at least one second target cell.

13. A base station, comprising: a transceiver, a memory, a processor, and a computer program stored in the memory and executed by the processor, wherein the processor executes the computer program to implement the steps of the method for receiving a beam failure recovery request according to claim 12.

14. The method according to claim 12, wherein the determining at least one first target cell according to a preset priority rule includes:
  determining the at least one first target cell according to one priority condition; or determining the at least one first target cell according to N priority conditions and priority levels of the N priority conditions, wherein N is a positive integer greater than 1.

15. The method according to claim 14, wherein the priority condition includes at least one of the following:

a priority of a cell where the terminal has not reported the beam failure event is higher than a priority of a cell where the terminal has reported the beam failure event;

a priority of a primary cell being higher than a priority of a secondary cell;

a priority of a cell with a lower cell index being higher than a priority of a cell with a higher cell index;

a priority of a cell in a first frequency band being higher than a priority of a cell in a second frequency band;

a priority of a cell with a lower carrier frequency being higher than a priority of a cell with a higher carrier frequency.

* * * * *